United States Patent
Takagi

(10) Patent No.: US 8,691,353 B2
(45) Date of Patent: Apr. 8, 2014

(54) POLARIZING PLATE, METHOD FOR PRODUCING POLARIZING PLATE, AND LIQUID CRYSTAL DISPLAY DEVICE

(75) Inventor: Takahiro Takagi, Sagamihara (JP)

(73) Assignee: Konica Minolta Opto, Inc., Tokyo (JP)

( * ) Notice: Subject to any disclaimer, the term of this patent is extended or adjusted under 35 U.S.C. 154(b) by 217 days.

(21) Appl. No.: 13/258,370

(22) PCT Filed: Apr. 26, 2010

(86) PCT No.: PCT/JP2010/057348
§ 371 (c)(1),
(2), (4) Date: Sep. 21, 2011

(87) PCT Pub. No.: WO2010/125997
PCT Pub. Date: Nov. 4, 2010

(65) Prior Publication Data
US 2012/0013828 A1    Jan. 19, 2012

(30) Foreign Application Priority Data

Apr. 27, 2009  (JP) .................................. 2009-107562
Jan. 14, 2010  (WO) .................. PCT/JP2010/050330

(51) Int. Cl.
*G02F 1/1335*  (2006.01)
*G02F 1/13363*  (2006.01)
*G02B 5/30*  (2006.01)

(52) U.S. Cl.
USPC ............ 428/1.33; 349/96; 349/118; 264/1.34

(58) Field of Classification Search
USPC ............ 428/1.3–1.33; 349/96, 117–118, 122; 264/1.34
See application file for complete search history.

(56) References Cited

U.S. PATENT DOCUMENTS

| | | | |
|---|---|---|---|
| 7,184,112 B2 | 2/2007 | Kuzuhara et al. | |
| 7,550,182 B2 | 6/2009 | Inagaki et al. | |
| 2003/0156235 A1* | 8/2003 | Kuzuhara et al. | 349/96 |
| 2005/0106334 A1* | 5/2005 | Kubo et al. | 428/1.31 |
| 2006/0292315 A1 | 12/2006 | Inagaki et al. | |
| 2007/0273815 A1 | 11/2007 | Moto | |

FOREIGN PATENT DOCUMENTS

| | | |
|---|---|---|
| CN | 1432851 A | 7/2003 |
| CN | 101196572 A | 6/2008 |
| CN | 101198891 A | 6/2008 |
| JP | 2000-111914 | 4/2000 |
| JP | 2001-188128 | 7/2001 |
| JP | 2006-317733 | 11/2006 |
| JP | 2008-268419 | 11/2008 |

OTHER PUBLICATIONS

JPO Machine English Translation of JP 2010-217500, Akasaka et al., Sep. 30, 2010.*
PO Machine English Translation of JP 2010-044245, Umemoto et al., Feb. 25, 2010.*
First Office Action which issued on Jul. 26, 2013 for corresponding Chinese application 201080018176.X.[d]

* cited by examiner

*Primary Examiner* — Sophie Hon
(74) *Attorney, Agent, or Firm* — Holtz Holtz Goodman & Chick, PC

(57) ABSTRACT

Disclosed are: a polarizing plate having visibility and viewing angle characteristics; and a liquid crystal display device using the polarizing plate. Specifically disclosed is a polarizing plate which is obtained by sandwiching a polarizer between first and second cellulose ester films. The polarizing plate is characterized in that the first cellulose ester film is formed from a cellulose ester having a total degree of substitution of acyl groups of 2.8-3.0, and the second cellulose ester film is formed from a cellulose ester having a total degree of substitution of acyl groups of 2.0-2.6, and has a retardation value Ro of 30-200 nm and a retardation value Rt of 70-300 nm. The polarizing plate is also characterized in that the first and second cellulose ester films are subjected to a saponification treatment wherein when the saponification condition is expressed as a saponification index M, the saponification index M1 of the first cellulose ester film and the saponification index M2 of the second cellulose ester film satisfy the relation of M1>M2.

6 Claims, No Drawings

POLARIZING PLATE, METHOD FOR PRODUCING POLARIZING PLATE, AND LIQUID CRYSTAL DISPLAY DEVICE

This application is the United States national phase application of International Application PCT/JP2010/057348 filed Apr. 26, 2010.

TECHNICAL FIELD

The present invention relates to a polarizing plate and a liquid crystal display, more specifically, to a polarizing plate which enables film thinning while employing a cellulose ester film excellent in adhesiveness to a polarizer as a polarizing plate protective film and a retardation film serving additionally as a polarizing plate protective film and exhibits excellent visibility and view angle characteristics when being used in a liquid crystal display, and a liquid crystal display employing the polarizing plate.

BACKGROUND ART

In recent years, liquid crystal displays are used not only for monitors for personal computers but also for TVs, and in the liquid crystal displays, techniques to enlarge the size and techniques to make luminance higher are developed, and demands for a thinner size are increasing. Accordingly, it is taken for granted that high durability is required, and further, demands for a thinner size for each component used for the liquid crystal displays are increasing.

Meanwhile, conventionally, as a retardation film used for improving visibility and view angle characteristics in a liquid crystal display, the common techniques dispose a polycarbonate film with properties exhibiting highly the birefringence of the resin itself or a retardation film (retardation plate), in which an optical anisotropy layer including a liquid crystal material is disposed on a cellulose film, between a polarizer and a liquid crystal cell.

However, the polycarbonate film has a poor adhesiveness for a polyvinyl alcohol film which includes biaxiality dyes as an additive, is stretched, and used generally as a polarizer. Problems arise such that when the polycarbonate film is pasted directly to a polarizer, the durability of a polarizer deteriorates, and when an adhesive layer or an inter layer is disposed between a retardation film and a polarizer, the resulting polarizing plate is made thicker.

Moreover, since the retardation film provided with an optical anisotropy layer including a liquid crystal material is made in a two layer structure as a support, the production process becomes complicate, and problems of film thickening arise.

Then, in order to increase the adhesive properties to the polarizer and to provide an excellent isotropy, cellulose ester film that is used conventionally as a polarizing plate protective film is provided with a retardation function. Further, studies are made to thin the polarizing plate and to enhance the durability of the polarizing plate.

Since cellulose triacetate film has originally a high isotropy and weak birefringence exhibiting property, the cellulose triacetate film is not suitable for a retardation film. Then, studies are made for a retardation film so as to add a so-called retardation increasing agent to a cellulose triacetate resin and to employ mixed fatty acid ester of celluloses such as cellulose acetate propionate that has a higher birefringence exhibiting property than a cellulose triacetate resin among cellulose ester resins (for example, refer to Patent Documents 1 and 2).

However, in the retardation film in which the above-mentioned retardation increasing agent is added, in order to make the retardation film thinner, it is necessary to increase an additive amount of the retardation increasing agent per film thickness. As a result, problems called bleed-out may arise such that additive agents may precipitate from film.

Moreover, although the retardation film employing the mixed fatty acid ester film of the cellulose has a high birefringence exhibiting property as compared with cellulose triacetate, the thinning of such a retardation film is required to increase further a stretch ratio. Accordingly, since the degree of difficulty in manufacture is high, there are problems in stable manufacture of the film. Further, since mixed fatty acid ester resin itself of cellulose has the high degree of difficulty in synthesis, problems arise in manufacture of the polarizing plate at low cost.

Then, the present inventors studied to prepare a polarizing plate such that a protective film which employs cellulose ester with the total degree of substitution of 2.1 to 2.6 by acyl groups having a high birefringence exhibiting property, exhibits retardation, and serves additionally as a retardation film is used as a protective film which is disposed at the liquid crystal cell side of a polarizer and is required to have an optical compensation function, and a cellulose ester film with a total degree of substitution of 2.8 to 3.0 and a high isotropic is disposed at the opposite side of the polarizer. This ensures to make the film thinner while maintaining the adhesiveness to the polarizer and to manufacture the polarizing plate with cheaper materials.

However, when the resulting polarizing plate was incorporated so as to produce a liquid crystal display, it was acknowledged that streak-like irregularities slightly occur in images at the time of black indication. Further, when the liquid crystal display has been preserved for a long period of time under a wet heat environment, wavelike irregularities occurred on images and a phenomenon in which visibility deteriorated was observed.

In the case where liquid crystal displays are used as large-sized liquid crystal displays, such as large-sized TV and external monitors, when liquid crystal displays are used with a back light the luminance of which is made high and under an external environment so that the liquid crystal displays are used under severer environment than ever before, the above problems are required to be improved.

RELATED-ART DOCUMENT

Patent Documents

Patent Document 1: Japanese Unexamined Patent Publication No. 2000-111914 official report
Patent Document 2: Japanese Unexamined Patent Publication No. 2001-188128 official report

SUMMARY OF THE INVENTION

Problems to be Solved by the Invention

In order to solve the above problems, the present inventors studied to use cellulose ester film for both surfaces of a polarizer to enhance adhesiveness to the polarizer while maintaining durability, and to use cellulose ester resin with a high retardation exhibiting property and a low degree of substitution as a protective film at a liquid crystal cell side so as to provide a function as a retardation film, thereby providing a polarizing plate made in a thinner film with cheep materials; and further to provide a polarizing plate which makes it possible to keep excellent visibility when being used for liquid crystal display devices which are required to provide high luminance and high image quality, such as large-sized TV and external monitors.

Conventionally, in the case where cellulose ester films are pasted on polarizer, in order to enhance adhesiveness, the cellulose ester films are generally subjected to saponification treatment with an alkaline solution so as to make the surface of the film to be hydrophilic. Examples of methods for carrying out the saponification treatment with an alkaline solution include methods for coating an alkaline solution onto the surface of cellulose ester film, and methods for dipping cellulose ester film in an alkaline solution. Usually, production of polarizing plates, in which cellulose ester films are used for both sides of a polarizer as a protection film and a retardation film, includes processes of applying saponification treatment to respective cellulose ester films, then washing and drying the cellulose ester films, and thereafter pasting these cellulose ester films to both sides of the polarizer. In the production, those processes are conducted continuously on an in-line mode, so that polarizing plates can be produced in high rate and at low cost.

Meanwhile, conditions at the time of application of saponification treatment to cellulose ester films include: the concentration of used alkaline solution, time for the saponification treatment (namely, a period of time after an alkaline solution is applied on the cellulose ester films until the cellulose ester films are washed, or a period of time after cellulose ester films are immersed into an alkaline solution until the cellulose ester films are washed), and the temperature of alkaline treatment liquid.

Generally, such conditions of the saponification treatment are appropriately set up in accordance with the kind of films to be applied with the saponification treatment. However, in the case where the pasting of cellulose ester films onto a polarizer is conducted on an in-line mode as mentioned above, it seems to be desirable that a solution tank to which an alkaline solution is supplied is made a common tank in order to avoid the enlargement and complication of an apparatus unless the circumstances are exceptional. Further, if consideration is given to the situation that cellulose ester films are pasted onto both sides of a polarizer on an in-line mode, it is preferable to equalize the conveying time of the cellulose ester films, and it is desirable to carry out the saponification treatment on the same conditions.

Furthermore, the usage of the same alkaline solution tank enables the apparatus to be simplified more. Therefore, in the case where cellulose ester films are pasted onto both sides of a polarizer, it seems to be desirable to make the saponification treatment conditions into the same conditions unless the circumstances are exceptional.

However, as a result of investigation by the present inventors for streak-like irregularities at the time of black indication and image irregularities after preservation under wet heat conditions that are appeared as problems in the above-mentioned large-sized TV and external monitors required to provide high luminance and high image quality, it turns out that such problems are caused by retardation films which are disposed at a liquid crystal cell side of a polarizer and are composed of cellulose ester films with a low degree of substitution. Especially, in the case where cellulose ester films having a high retardation exhibiting property with a low degree of substitution as with the present invention are used as retardation films and cellulose ester films excellent in isotropy with a high degree of substitution are used as protective films disposed opposite to the retardation films, it becomes clear that the respective surfaces of the retardation films slightly deteriorate after the saponification treatment, which causes problems in visibility in the above liquid crystal displays.

Therefore, an object of the present invention is to provide a polarizing plate in which cellulose ester films are used for both sides of a polarizer so as to enhance adhesiveness to the polarizer while maintain durability and cellulose resin having a high retardation exhibiting property with a low degree of substitution is used for a protective film (second cellulose ester film) at a liquid crystal cell side so as to provide a function as a retardation film so that the polarizing plate can be made thin with cheaper materials. Further, an object of the present invention is to provide a polarizing plate which enables to keep excellent visibility when being employed in liquid crystal display devices, such as large-sized TV and external monitors, which are required to provide high luminance and high image quality, and to provide a liquid crystal display device which employs the above polarizing plate and is excellent in visibility and viewing angle characteristics.

Means for Solving the Problems

The above object of the present invention can be attained by the following structures.
1. In a polarizing plate in which a polarizer is sandwiched between a firs cellulose ester film and second cellulose ester film, the polarizing plate is characterized in that the first cellulose ester film is composed of cellulose ester with an acyl group total substitution degree (i.e., a total degree of substitution by acyl groups) of 2.8 to 3.0 and the second cellulose ester film is composed of cellulose ester with an acyl group total substitution degree of 2.0 to 2.6, a retardation value Ro represented by a formula shown below is 30 nm or more and 200 nm or less and a retardation value Rt is 70 nm or more and 300 nm or less, and the first cellulose ester film and the second cellulose ester film are subjected to saponification treatment so as to satisfy a conditional formula of M1>M2, wherein when saponification treatment conditions are represented by a saponification index M represented by a formula shown below, M1 is the saponification index of the first cellulose ester film and M2 is the saponification index of the second cellulose ester film.

$$Ro = (nx - ny) \times d$$

$$Rt = \{(nx + ny)/2 - nz\} \times d$$

(nx is a film in-plane refractive index in the slow axis direction, ny is a film in-plane refractive index in the fast axis direction, nz is a refractive index in the film thickness direction, and d is a thickness (nm) of a film.)

Saponification index (M): the concentration (mol %) of an alkaline solution for saponification×a saponification temperature (×1/10° C.)×a saponification time (×1/10 seconds)

Provided that the concentration of an alkaline solution for saponification is in a range of 1 to 4 mol %, the saponification temperature is 10 to 80° C., and the saponification time is 10 to 100 seconds.
2. The polarizing plate described in the item 1 is characterized in that the second cellulose ester film is composed of cellulose ester with an acetyl group substitution degree of 2.0 to 2.6.
3. The polarizing plate described in the item 1 or 2 is characterized in that the second cellulose ester film is composed of cellulose ester with an acyl group total substitution degree of 2.1 to 2.5.
4. The polarizing plate described in the item 3 is characterized in that the second cellulose ester film is composed of cellulose ester with an acyl group total substitution degree of 2.2 to 2.5.

5. The polarizing plate described in any one of the items 1 to 4 is characterized in that a difference (M1−M2) of the saponification index is 45 or more and 175 or less.

6. The polarizing plate described in any one of the items 1 to 5 is characterized in that the saponification index M1 of the first cellulose ester film is in a range of 90 to 220 and the saponification index M2 of the second cellulose ester film is in a range of 5 to 45.

7. A liquid crystal display device is characterized by employing the polarizing plate described in any one of the items 1 to 6 on at least one surface of a liquid crystal cell.

8. In a method for producing a polarizing plate in which a polarizer is sandwiched between a first cellulose ester film and second cellulose ester film, the first cellulose ester film is composed of cellulose ester with an acyl group total substitution degree (i.e., a total degree of substitution by acyl groups) of 2.8 to 3.0 and the second cellulose ester film is composed of cellulose ester with an acyl group total substitution degree of 2.0 to 2.6, a retardation value Ro represented by a formula shown below is 30 nm or more and 200 nm or less and a retardation value Rt is 70 nm or more and 300 nm or less, the method comprises:

a process of subjecting the first cellulose ester film and the second cellulose ester film to saponification treatment, and a process of pasting the first cellulose ester film and the second cellulose ester film which have been subjected to the saponification treatment, onto the polarizer, wherein when saponification treatment conditions in the saponification treatment process are represented by a saponification index M represented by a formula shown below, the saponification treatment is conducted so as to satisfy a conditional formula of M1>M2, where M1 is the saponification index of the first cellulose ester film and M2 is the saponification index of the second cellulose ester film.

$$Ro = (nx - ny) \times d$$

$$Rt = \{(nx + ny)/2 - nz\} \times d$$

(nx is a film in-plane refractive index in the slow axis direction, ny is a film in-plane refractive index in the fast axis direction, nz is a refractive index in the film thickness direction, and d is a thickness (nm) of a film.)

Saponification index (M): the concentration (mol %) of an alkaline solution for saponification×a saponification temperature ($\times 1/10°$ C.)×a saponification time ($\times 1/10$ seconds)

Provided that the concentration of an alkaline solution for saponification is in a range of 1 to 4 mol %, the saponification temperature is 10 to 80° C., and the saponification time is 10 to 100 seconds.

Effect of the Invention

As a result of diligent investigation by the present inventors, in a polarizing plate in which a first cellulose ester film with a high degree of substitution is passed as a polarizing plate protective film on one surface of a polarizer and a second cellulose ester film with a low degree of substitution provided with a predetermined retardation is pasted on another surface as a retardation film serving also a polarizing plate protective film, in order to establish sufficient adhesion property for respective cellulose ester films, saponification condition is required to conform with that necessary for the first cellulose ester film with a high degree of substitution. With the resulting saponification condition, it turns out that the surface of the second cellulose ester film with a low degree of substitution provided with a predetermined retardation deteriorates, which influences the visibility of the liquid crystal display device. Further, the present inventors find that the above-mentioned problems can be solved by the adjustment of the saponification treatment conditions to make the saponification index M1 of the first cellulose ester film and the saponification index M2 of the second cellulose ester film to satisfy the condition formula of M1>M2 in the specific respective ranges of concentration, temperature and time.

The present invention can provide a polarizing plate which can be made thin even using cellulose ester films excellent in adhesiveness to a polarizer as a polarizing plate protective film and a retardation film serving also as a polarizing plate protective film and is excellent in visibility and viewing angle characteristics when being used in a liquid crystal display device, a liquid crystal display device using the polarizing plate, and a method for producing a polarizing plate.

EMBODIMENT FOR CARRYING OUT THE INVENTION

Hereafter, the best modes for carrying out the present invention will be described. However, the present invention is not limited to these modes.

The polarizing plate of the present invention is provided with a polarizer, a polarizing plate protective film (the first cellulose ester film), and a retardation film (the second cellulose ester film), and is characterized in that the polarizing plate protective film and the retardation film are subjected the saponification treatment on the respective different conditions.

As a result of diligent studies about streak-like irregularities occurring at the time of black indication and wavy image irregularities occurring after being used under wet heat conditions in the case where a polarizing plate in which cellulose ester films different in acyl group total substitution degree as mentioned above are arranged as a polarizing plate protective film and a retardation film is disposed in a liquid crystal display device with high luminance and high image quality, the present inventors find that saponification treatment is conducted on different conditions to make the saponification index M1 of the cellulose ester film with a high acyl group total substitution degree used as a polarizing plate protective film and the saponification index M2 of the cellulose ester film with a low acyl group total substitution degree used as a retardation film to satisfy the conditional formula of M1>M2 in the respective specific ranges of saponification temperature, saponification time, and concentration of an alkaline solution for saponification, and the resulting cellulose ester films are pasted on a polarizer to form a polarizing plate, whereby when the polarizing plate is assembled in a liquid crystal display device, streak-like irregularities and wavy image irregularities can be greatly improved.

Moreover, a liquid crystal display which employs the polarizing plate according to the present invention on at least one surface of a liquid crystal cell ensures to provide a liquid crystal display excellent in visibility and view angle characteristics.

Hereafter, description will be given with regard to each element in the present invention.

Polarizer

A polarizer according to the present invention is an element which allows only light having a polarized wave plane in a predetermined direction to pass therethrough, and the typical polarizer commonly known at present is polyvinyl alcohol type polarizer film, which is classified into polyvinyl alcohol type film being dyed with iodine and polyvinyl alcohol type film being dyed with dichroic dye.

Polarizer is prepared by film formation from polyvinyl alcohol aqueous solution, and the obtained film is uniaxially stretched and dyed, or is uniaxially stretched after being dyed, preferably followed by being subjected to a durability treatment with a boron compound. The thickness of polarizer is preferably 5 to 30 μm and specifically preferably 10 to 20 μm.

Moreover, an ethylene-modified polyvinyl alcohol film which is disclosed in the following patent documents 3 and 4 and has a content of ethylene unit being 1 to 4 mol %, a degree of polymerization being 2000 to 4000, and a degree of saponification being 99.0 to 99.99 mol % may be also preferably employed.

Among them, an ethylene-modified polyvinyl alcohol film with a hot water cutting temperature of 66 to 73° C. may be preferably employed.

Further, in order to decrease color spots, it may be more preferable that a difference in hot water cutting temperature between two points which separate by 5 cm from each other in the TD direction of the film is 1° C. or less. Furthermore, in order to decrease color spots, it may be still more preferable that a difference in hot water cutting temperature between two points which separate by 1 cm from each other in the TD direction of the film is 0.5° C. or less.

A polarizer utilizing this ethylene modified polyvinyl alcohol film is excellent in polarizing ability and durability, as well as exhibits few color spottiness, and is specifically preferably applied in a large size liquid crystal display device.

A protective film is pasted to one side or both sides of the polarizer prepared as above so that a polarizing plate is prepared. Examples of adhesives used at the time of pasting include a PVA adhesive and an urethane adhesive. Of these, a PVA adhesive is preferable.

Onto the polarizer of the present invention, a polarizing plate protective film to provide sufficient mechanical strength, and a retardation film which has a function of a optical compensation layer to improve visibility of a liquid crystal display device as well as a function of a polarizing plate protective film, are pasted, whereby a polarizing plate is prepared.

First Cellulose Ester Film and Second Cellulose Ester Film

Preferable requirements of the first cellulose ester film of the present invention and the second cellulose ester film used in the present invention include: easiness in production, good adhesiveness with a polarizer, and optically transparence.

The term "transparence" used in the present invention means that the transmittance of visible light is 60% or more, preferably 80% or more, and particularly preferably 90% or more.

Examples of cellulose ester as main components of the first cellulose ester film of the present invention and the second cellulose ester film of the present invention include cellulose acetate, cellulose acetate butyrate, and cellulose acetate propionate, and among them, a cellulose acetate is used preferably.

As the first cellulose ester film of the present invention, from the viewpoint of optical isotropy required for a polarizing plate protective film, film composed of cellulose ester in which X and Y exist in a rage represented by Formula (II) where a degree of substitution by an acetyl group is X and a degree of substitution by an acyl group is X, is employed.

$$2.8 \leq X+Y \leq 3.0 \qquad \text{Formula (II)}$$

That is, the first cellulose ester film is a film composed of cellulose ester with a total acyl group substitution degree of 2.8 or more and 3.0 or less.

The first cellulose ester film is composed of cellulose ester which satisfies $2.8 \leq X \leq 3.0$, namely, preferably is a cellulose triacetate film.

Herein, in the present invention, in the case where the expression (cellulose ester film "is composed" of specific cellulose ester) is used, the expression means that the specific cellulose ester is made as a main component, that is, the cellulose ester film contains the specific cellulose ester in an amount exceeding 50% by weight. Accordingly, the specific cellulose ester may contain another resin in a range which does not spoil the function of the present invention, and may contain various kinds of additives in accordance with purposes.

As the second cellulose ester film relating to the present invention, from the viewpoints of high retardation exhibiting property, possibility to make a film thin even if being made to a retardation film having a high retardation, and enablement to suppress a stretching ratio, which exhibits retardation, to be low, film composed of cellulose ester which satisfied a range represented by the following Formula (I) may be employed.

$$2.0 \leq X+Y \leq 2.6 \qquad \text{Formula (I)}$$

That is, the second cellulose ester film is a film composed of cellulose ester with a total acyl group substitution degree of 2.0 or more and 2.6 or less.

Preferably, cellulose ester satisfies $2.0 \leq X \leq 2.6$. Further, total acyl group substitution degree (X+Y) is preferably $2.1 \leq X+Y < 2.5$, more preferably $2.2 \leq X+Y < 2.5$, and portions which are not substituted exist as a hydroxyl group.

In the second cellulose ester film relating to the present invention, although the needed retardation becomes different in accordance with the required optical compensation effect, from the viewpoints of utilization of the high retardation exhibiting property, an in-plane direction retardation Ro defined by the following formula is preferably 30 nm or more, more preferably in a range of 30 to 200 nm, and still more preferably in a range of 30 to 90 nm, and a thickness direction retardation Rt is preferably 70 nm or more, and more preferably in a range of 70 to 300 nm.

Although a method for adjusting retardation is not limited specifically, an adjusting method with stretching treatment is common. The adjusting method will be mentioned later in detail.

The cellulose ester used for these polarizing plate protective films and retardation films relating to the present inventions can be synthesized by well-known methods.

Cellulose as raw materials of cellulose ester utilized in a retardation film and a polarizing plate protective film relating to the present invention is not specifically limited, and includes such as cotton linter, wood pulp (obtained from acicular trees or from broad leaf trees) and kenaf. Further, cellulose ester prepared from them can be utilized by mixing each of them at an arbitrary ratio. Cellulose ester, in the case that an acylation agent as a cellulose starting material is acid anhydride (such as acetic anhydride, propionic anhydride, and butyric anhydride), is prepared by a reaction utilizing a proton type catalyst such as sulfuric acid in an organic acid such as acetic acid or in an organic solvent such as methylene chloride.

In the case that an acylation agent is acid chloride ($CH_3COCl$, $C_2H_5COCl$ or $C_3H_7COCl$), the reaction is performed utilizing a basic compound such as amine as a catalyst. Specifically, the synthesis can be performed referring to a method described in JP-A H10-45804. The cellulose ester used in the present invention is obtained through a reaction using in combination of the above acylation agents depending on the acylation degree. In an acylation reaction to form a cellulose ester, an acyl group reacts with the hydroxyl group of a cellulose molecule. A cellulose molecule is made up of many glucose units connected each other, and a glucose unit contains three hydroxyl groups. The number of hydroxyl groups substituted by acyl groups in a glucose unit is referred to as a degree of acetyl substitution (in mol %). For example, in the case of cellulose triacetate, all the three hydroxyl groups in one glucose unit are substituted by acetyl groups (practically: 2.6 to 3.0).

Measurement of a degree of substitution of an acyl group can be performed based on ASTM-D817-96.

The number average molecular weight of cellulose ester is preferably 40,000-200,000, because a mechanical strength at the time of film forming becomes strong, and a dope solution becomes proper viscosity, and more preferably 50,000-150,000. Further, the ratio of weight average molecular weight (Mw)/number average molecular weight (Mn) is preferably in a range of 1.4 to 4.5.

Although the second cellulose ester film of the present invention is required to have Ro of 30 nm or more and 200 nm or less and Rt of 70 nm or more and 300 nm or less, there is no restraint in Ro and Rt for the first cellulose ester film. These Ro and Rt can be adjusted by the usual stretching treatment at the time of film production.

In the second cellulose ester film relating to the present invention, it is desirable that difference in refractive index between its one surface and its opposite surface (also referred to as a film obverse surface and reverse surface) is in a range of $5 \times 10^{-4}$ or more and $5 \times 10^{-3}$ or less.

It is desirable that the second cellulose ester film relating to the present invention contains the following plasticizers particularly from the viewpoints of the dimensional stability in the environmental variation which causes the unevenness of a polarizing plate.

Ester Compound which Includes One or More and 12 or Less of at Least One Kind of a Furanose Structure or a Pyranose Structure and in Which all or a Part of OH Groups in its Structure is Esterified The second cellulose ester film relating to the present invention preferably includes an ester compound which includes one or more and 12 or less of at least one kind of a furanose structure or a pyranose structure and in which all or a part of OH groups in its structure is esterified.

The ratio of esterification is preferably 70% or more of OH groups which exist in the pyranose structure or the furanose structure.

In the present invention, the ester compounds are collectively referred to as sugar ester compounds.

Examples of the ester compounds preferably used in the present invention include the following compounds. However, the present invention is not limited to these compounds.

Examples include glucose, galactose, mannose, fructose, xylose, or arabinose, lactose, sucrose, nystose, 1F-fructosylnystose, stachyose, maltitol, lactitol, lactulose, cellobiose, maltose, cellotriose, maltotriose, raffinose and kestose.

In addition, gentiobiose, gentiotriose, gentiotetraose, xylotriose, and galactosyl-sucrose may be employed.

Among these compounds, compounds having both of the furanose structure and the pyranose structure are preferable.

As examples of the compounds, sucrose, kestose, nystose, 1F-fructosylnystose, and stachyose may be preferable, in particular, sucrose may be more preferable.

Monocarboxylic acids to be used to esterify all or a part of OH groups of the pyranose structure or the furanose structure of the present invention, are not specifically limited, and known aliphatic monocarboxylic acids, alicyclic monocarboxylic acids and aromatic monocarboxylic acids may be used. These monocarboxylic acids may be used singly or in combination of two or more kinds.

Examples of preferable aliphatic monocarboxylic acid include a saturated fatty acid such as acetic acid, propionic acid, butylic acid, isobutylic acid, valerianic acid, capronic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanic acid, arachidic acid, behenic acid, lignoceric acid, cerotic acid, heptacosanoic acid, montanic acid and melissic acid, and a unsaturated fatty acid such as undecylic acid, oleic acid, sorbic acid, linolic acid, linolenic acid, arachidonic acid and octenic acid.

Examples of preferable alicyclic monocarboxylic acid, include acetic acid, cyclopentane carboxylic acid, cyclohexane carboxylic acid, cyclo octane carboxylic acid, and derivatives of them.

Examples of preferable aromatic monocarboxylic acid include benzoic acid, an aromatic monocarboxylic acid formed by introducing one to five alkyl or alkoxy groups into the benzene ring of benzoic acid such as toluic acid, an aromatic monocarboxylic acid having two or more benzene rings such as cinnamic acid, benzilic acid, biphenyl carboxylic acid, naphthalene carboxylic acid, tetralin carboxylic acid and derivatives thereof. More concretely, xylic acid, hemellitic acid, mesitylenic acid, prehnitylic acid, γ-isodurylic acid, isodurylic acid, mesitoic acid, α-isodurylic acid, cuminic acid, α-toluic acid, hydratropic acid, atropic acid, cinnamic acid, hydrocinnamic acid, salicylic acid, o-anisic acid, m-anisic acid, p-anisic acid, creosotic acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asaronic acid, mandelic acid, homoanisic acid, Homovanillic acid, homoveratric acid, o-homoveratric acid, phthalonic acid, p-coumaric acid. Among them, benzoic acid is particularly preferable.

Esterified compounds of oligosaccharide may be employed as a compound which includes 1 to 12 of at least one kind of a furanose structure or a pyranose structure relating to the present invention.

The oligosaccharide can be produced by action of ferment such as amylase to starch, cane sugar and so on. Examples of oligosaccharides usable in the present invention, include marthe oligosaccharide, isomarthe oligosaccharide, fructo oligosaccharide, galact oligosaccharide, and xylo oligosaccharide.

Moreover, the above-mentioned ester compound may be a compound in which one or more and 12 or less of at least one kind of the pyranose structure or the furanose structure represented by the following Formula (A) are condensed. In Formula (A), $R_{11}$ to $R_{15}$, and $R_{21}$ to $R_{25}$ each represents an acyl group with 2 to 22 carbon atoms or a hydrogen atom, m and n represent an integer of 0 to 12 respectively, and m+n represents an integer of 1 to 12.

Formula (A)

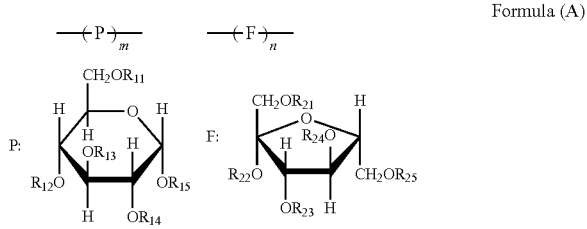

$R_{11}$ to $R_{15}$, and $R_{21}$ to $R_{25}$ may be preferably a benzoyl group and a hydrogen atom. The benzoyl group may further include a substituent R26 (p is 0 to 5), and examples of the substituent R26 include an alkyl group, an alkenyl group, an alkoxyl group, and a phenyl group. Furthermore, these alkyl group, alkenyl group, and phenyl group may also include substituent. The oligosaccharide may also be produced by the same method as the ester compound of the present invention.

Concrete examples of the esterified compound relating to the present invention are listed below, but the present invention is not limited to these examples.

Compound 1

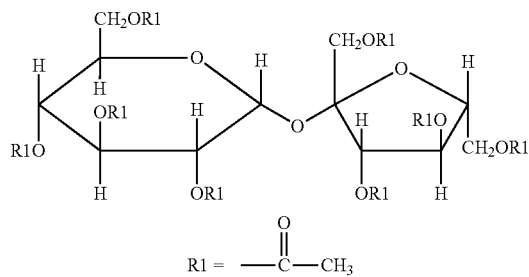

Compound 2

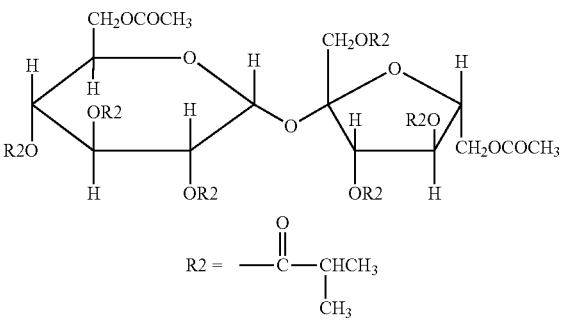

Compound 3

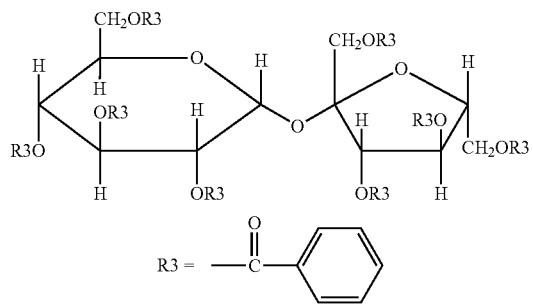

Average substitution degree 7.0

Compound 4

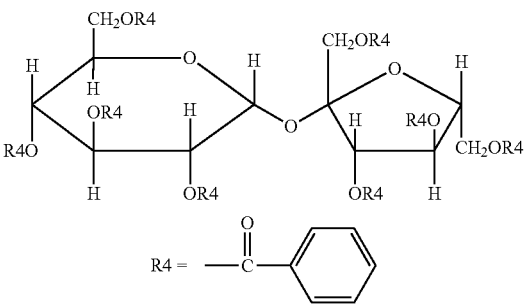

Average substitution degree 6.5

Compound 5

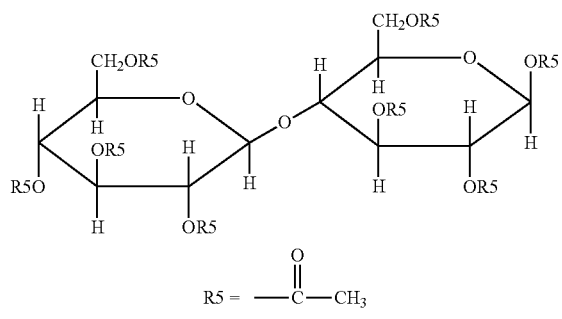

Compound 6

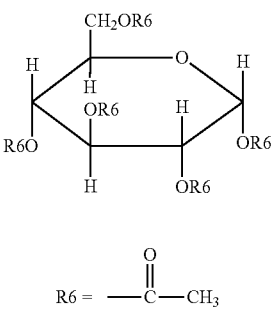

Compound 7

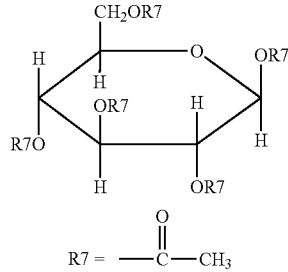

Compound 8

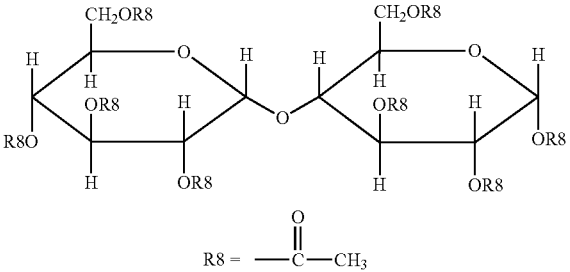

-continued
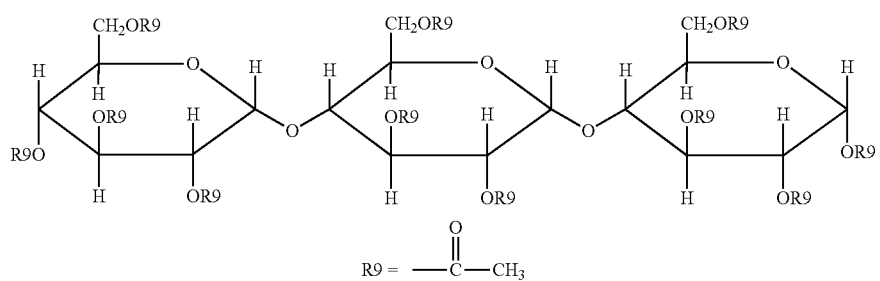
Compound 9
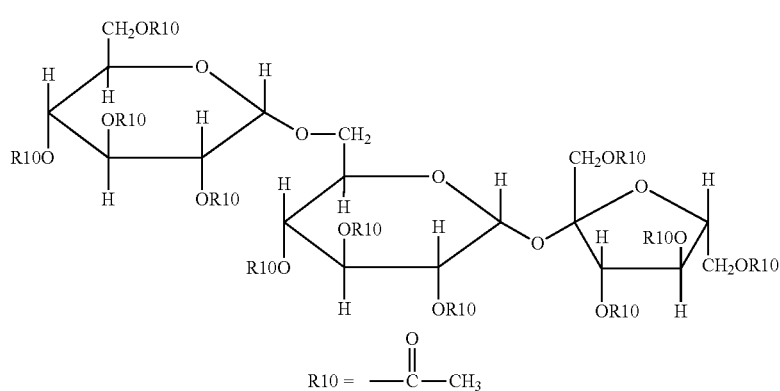
Compound 10
Compound 11
Compound 12
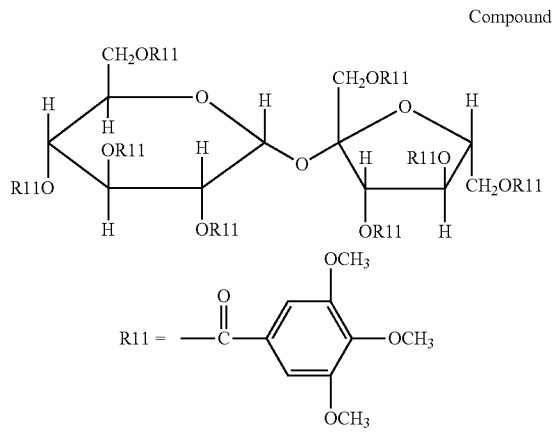
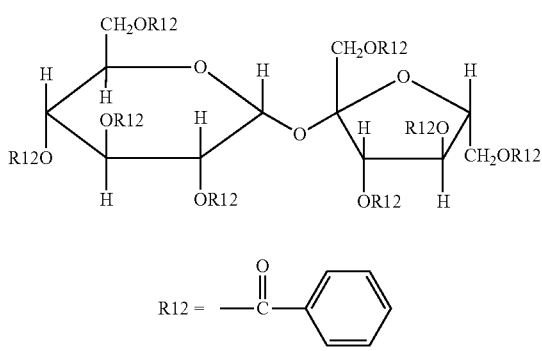
Average substitution degree 7.0
Compound 13
Compound 14
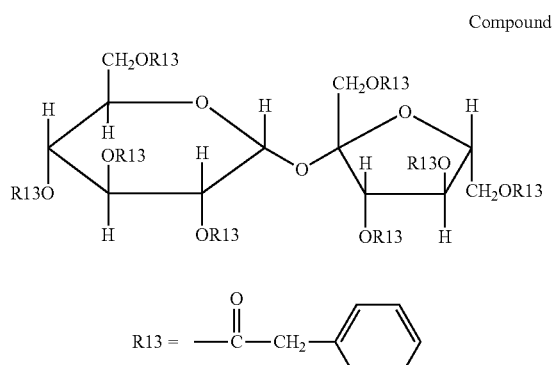
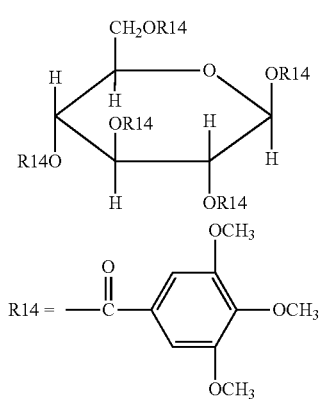

-continued
Compound 15
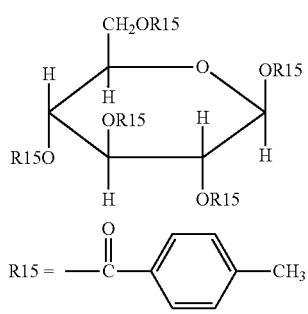
Compound 16
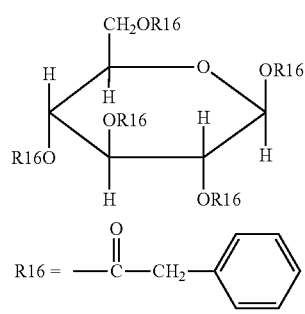
Compound 17
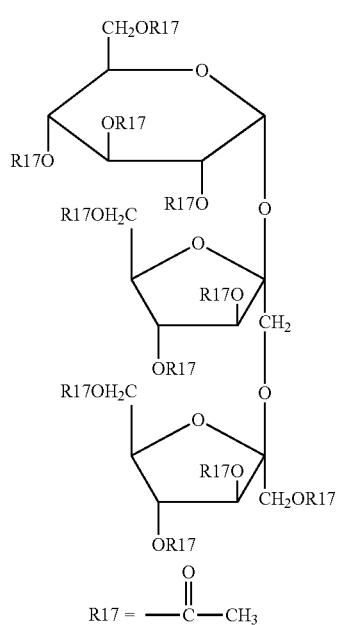
Compound 18
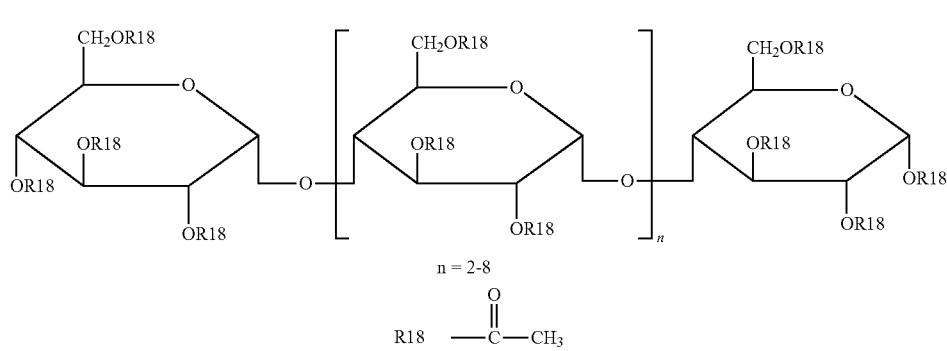
Compound 19
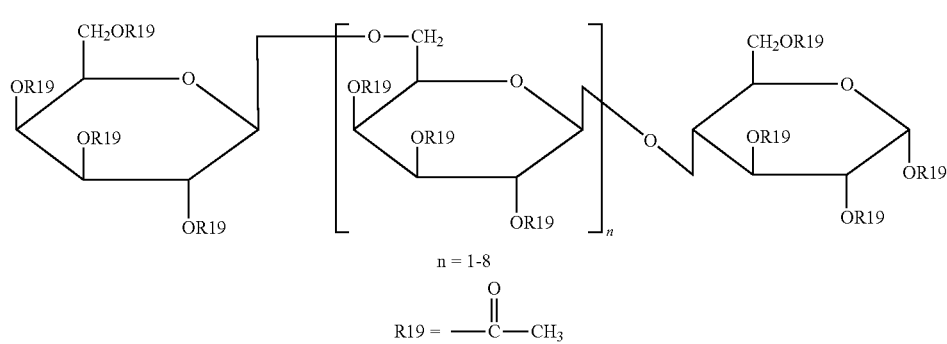

-continued
Compound 20
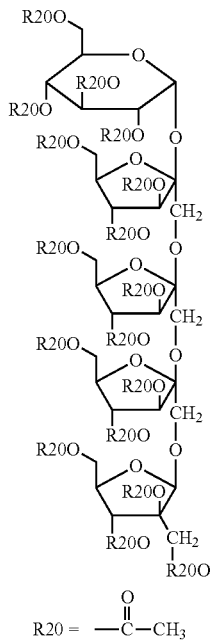
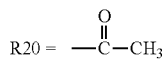
Compound 21
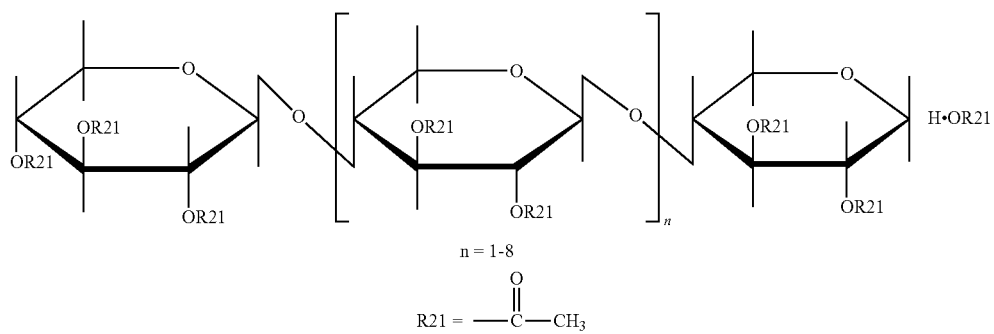
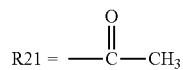
Compound 22
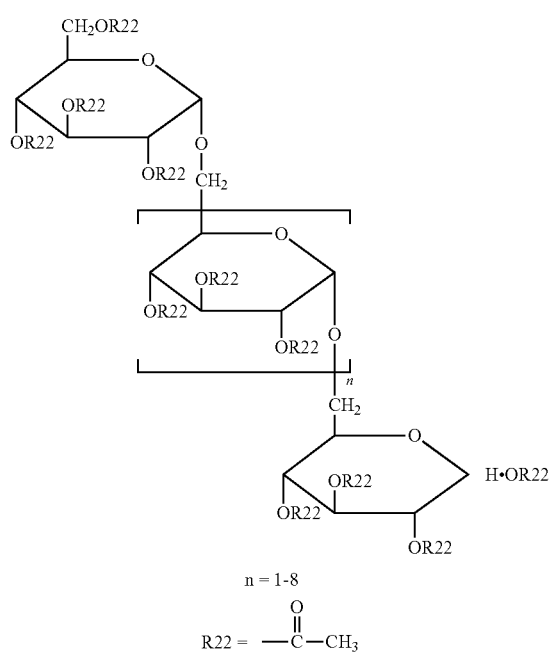
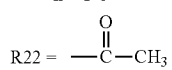

In order to suppress the fluctuation of retardation values so as to stabilize a display appearance quality, the esterified compounds may be contained preferably 1 to 30% by weight to the cellulose ester film, and more preferably 5 to 30% by weight.

Compound with the Structure Represented by Formula (c)

It is desirable to use a compound with the structure represented by Formula (c) for the second cellulose ester film used in the present invention. The compound with the structure represented by Formula (c) is a polyester type plasticizer, and the polyester type plasticizer which includes an aromatic ring or a cycloalkyl ring in its molecule may be used.

Formula (C)

where B represents benzene monocarboxylic acid group, G represents an alkylene glycol group having 2-12 carbon atoms, an aryl glycol group having 6-12 carbon atoms, or an oxyalkylene glycol group having 4-12 carbon atoms, A represents an alkylene dicarboxylic acid having 4-12 carbon atoms, or an aryl dicarboxylic acid group having 6-12 carbon atoms, and n represents an integer of 1 or more.

A compound represented by Formula (C) is structured by benzene monocarboxylic acid group represented with B, an alkylene glycol group or an oxyalkylene glycol group or an aryl glycol group represented with G, and an alkylene dicarboxylic acid group or an aryl dicarboxylic acid group represented with A and is prepared through a reaction similar to the preparation reaction of a common polyester plasticizer.

Examples of a benzene monocarboxylic acid component of the ester plasticizer of the present invention include: benzoic acid, p-tert-butyl benzoic acid, o-toluic acid, m-toluic acid, p-toluic acid, dimethyl benzoic acid, ethyl benzoic acid, n-propyl benzoic acid, aminobenzoic acid and acetoxy benzoic acid, which may be used alone or in combination of two or more acids.

Examples of an alkylene glycol component having 2 to 12 carbon atoms of the polyester plasticizer preferably usable for the second cellulose ester film used in the present invention include: ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (also known as neopentylglycol), 2,2-diethyl-1,3-propanediol (also known as 3,3-dimethylol pentane), 2-n-butyl-2-ethyl-1,3-propanediol (also known as 3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, which may be used alone or in combination of two or more glycols.

Since alkylene glycol having carbon atoms of 2 to 12 is especially excellent in compatibility with cellulose ester, it is especially desirable.

Examples of an oxyalkylene glycol component having 4 to 12 carbon atoms of the aromatic terminal ester of the present invention include: diethylene glycol, triethylene glycol, tetraethylene glycol, dipropylene glycol and tripropylene glycol, which may be used alone or in combination of two or more glycols.

Examples of an alkylene dicarboxylic acid component having 4 to 12 carbon atoms of the aromatic terminal ester of the present invention include: succinic acid, maleic acid, the fumaric acid, glutaric acid, adipic acid, azelaic acid, sebacic acid and dodecane dicarboxylic acid, which may be used alone or in combination of two or more acids. Examples of an arylene dicarboxylic acid component having 6 to 12 carbon atoms include: phthalic acid, terephthalic acid, 1,5-naphthalene dicarboxylic acid and 1,4-naphthalene dicarboxylic acid.

The number average molecular weight of the polyester plasticizer used in the second cellulose ester film relating to the present invention is preferably 300 to 1500, and more preferably 400-1000. The acid value of the polyester plasticizer used in the present invention is 0.5 mgKOH/g or less and the hydroxyl value is 25 mgKOH/g or less, more preferably, the acid value is 0.3 mgKOH/g or less and the hydroxyl value is 15 mgKOH/g or less.

Although concrete compounds of the aromatic terminal ester type plasticizer with the structure represented by Formula (C) and usable in the present invention are shown below, the present invention is not limited to these.

(1)

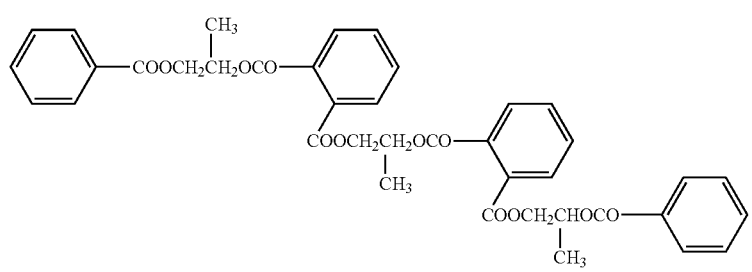

Mw: 696

(2)

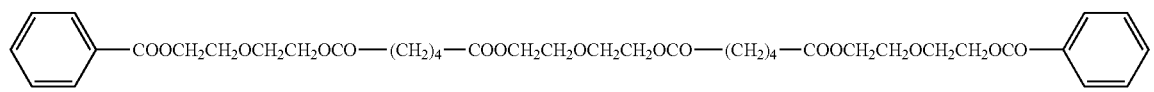

Mw: 746

-continued
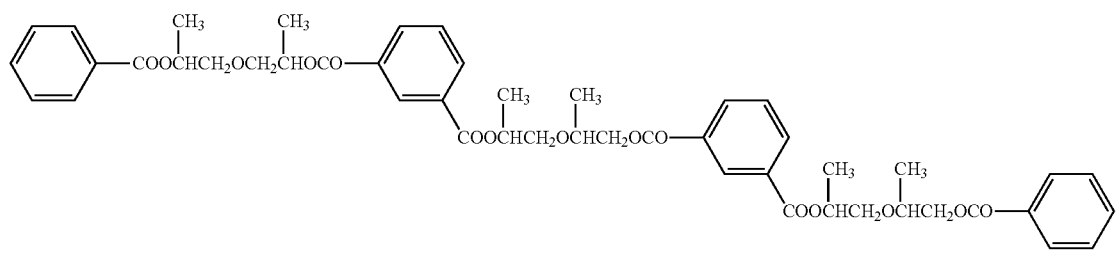
Mw: 830 (3)
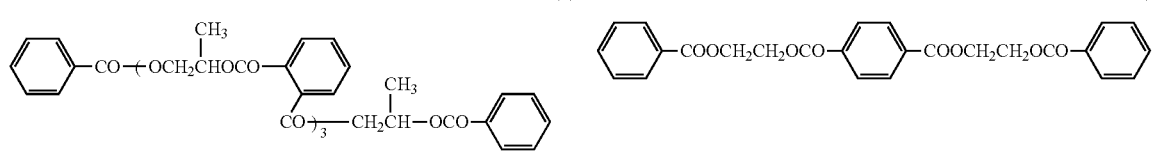
(4) Mw: 886     (5) Mw: 462
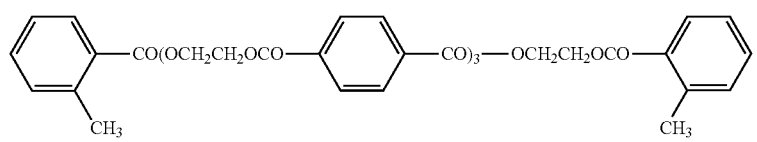
(6) Mw: 874
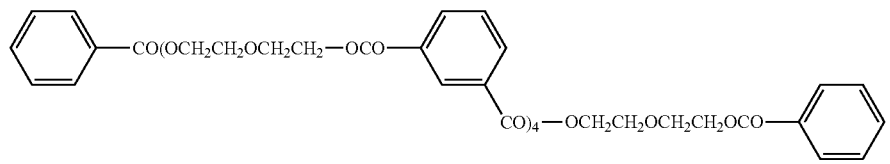
(7) Mw: 1258
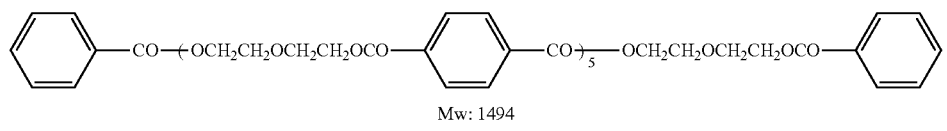
(8) Mw: 1494
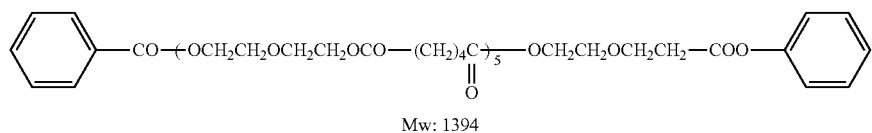
(9) Mw: 1394
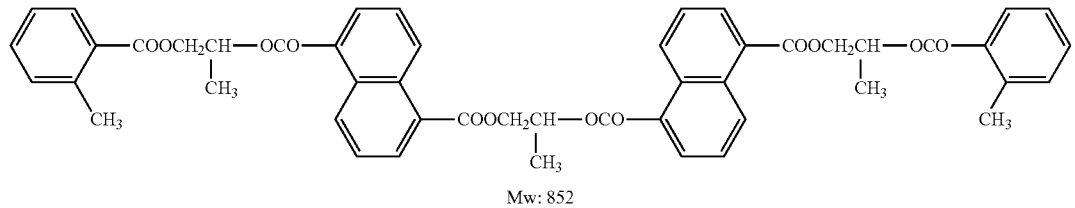
(10) Mw: 852
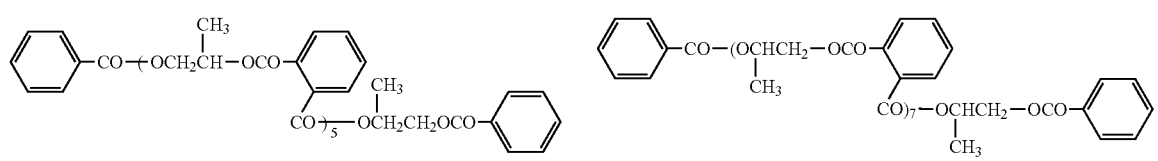
(11) Mw: 1314     (12) Mw: 1726

-continued
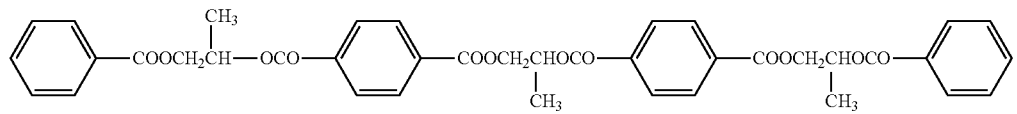
Mw: 696
(13)
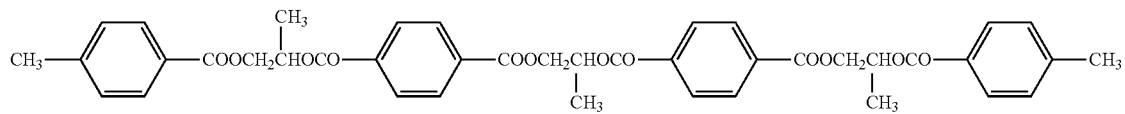
Mw: 724
(14)
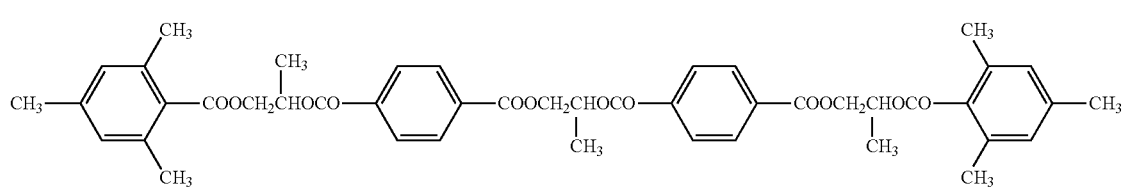
Mw: 780
(15)
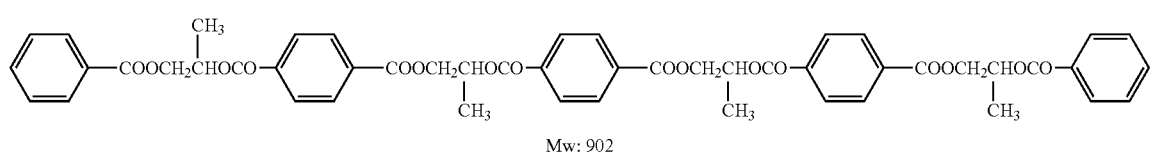
Mw: 902
(16)
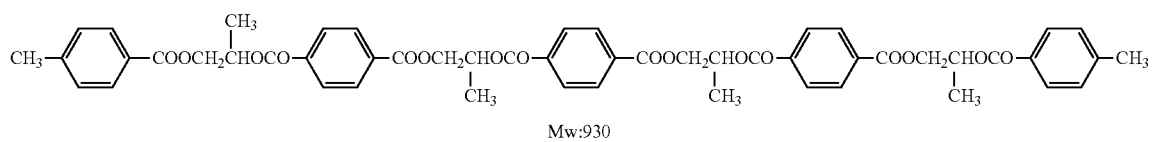
Mw: 930
(17)
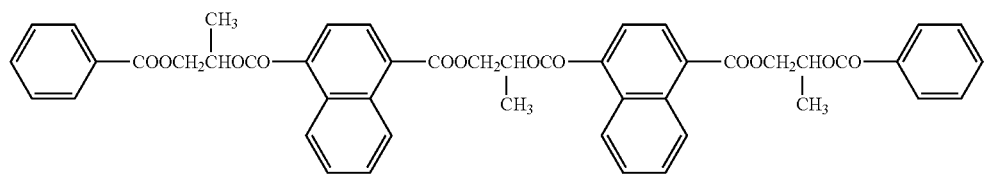
Mw: 796
(18)
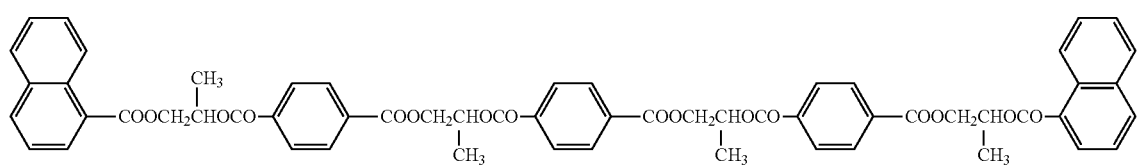
Mw: 1002
(19)
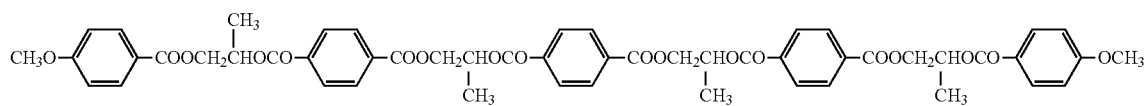
Mw: 960
(20)

Other plasticizers described below may be employed in combination.

Phosphoric acid ester based plasticizers, phthalic acid ester based plasticizers, trimellitic acid ester based plasticizers, pyromellitic acid based plasticizers, glycolate based plasticizers, citric acid ester based plasticizers, and polyester based plasticizers may be employed. Examples of phosphoric acid ester based plasticizers include triphenyl phosphate, tricresyl phosphate, cresyl diphenyl phosphate, octyl diphenyl phosphate, diphenyl biphenyl phosphate, trioctyl phosphate, and tributyl phosphate. Examples of phthalic acid ester based plasticizers include diethyl phthalate, dimethoxyethyl phthalate, dimethyl phthalates, dioctyl phthalate, dibutyl phthalate, di-2-ethylhexyl phthalate, and butyl benzyl phthalate. Examples of trimellitic acid based plasticizers include tributyl trimellitate, triphenyl trimellitate, and trimethyl trimellitate. Preferably employed as pyromellitic acid ester plasticizers may be tetrabutyl pyromellitate, tetraphenyl pyromellitate, and tetraethyl pyromellitate. Examples of glycolic acid ester based plasticizers include triacetin, tributyrin, ethylphthalyl ethyl glycolate, methylphthalyl ethyl glycolate, and butylnaphthalyl butyl glycolate. Examples of citric acid ester based plasticizers include trimethyl citrate, tri-n-butyl citrate, acetyltriethyl citrate, acetyl-tri-n-butyl citrate, and acetyltri-n-(2-ethylhexyl)citrate. Examples of other carboxylate esters include trimethylolpropane tribenzoate, butyl oleate, methyl acetyl ricinoleate, dibutyl sebacate, and various trimellitic acid esters. Examples of polyester type plasticizers include copolymers of dibasic acids such as an aliphatic dibasic acid, an alicyclic dibasic acid, and an aromatic dibasic acid with glycol.

Although aliphatic dibasic acids are not particularly limited, adipic acid, sebacic acid, phthalic acid, terephthalic acid, and 1,4-cyclohexylcroboxylic acid may be employed. Further, examples of glycols include ethylene glycol, diethylene glycol, 1,3-propylene glycol, 1,2-propylene glycol, 1,4-butylene glycol, 1,3-butylene glycol, and 1,2-butylene glycol.

These dibasic acids and glycols may be employed individually or in combinations of at least two types.

The used amount of these plasticizers, from the points, such as film performance, workability and the like, is preferably 1 weight % to 20 weight %, and particularly preferably 3 weight % to 13 weight % to cellulose ester.

Other Additives

Ultraviolet Absorber

UV absorber is preferably employed for cellulose ester film (especially, the first cellulose ester film) relating to the present invention. As such a UV absorber, a UV absorber with less absorption of visible rays with a wavelength of 400 nm or more is preferably used from viewpoints of excellent absorption property for ultraviolet rays with a wavelength of 370 nm or less and excellent liquid crystal display property.

Examples of a UV absorbing agent preferably used in the present invention include: an oxybenzophenone based compound, a benzotriazol based compound, a salicylic acid ester based compound, a benzophenone based compound, a cyanoacrylate based compound, a triazine based compound and a nickel complex salt.

Examples of benzotriazol based UV absorbing agent will be given below, however, the present invention is not limited thereto.

UV-1: 2-(2'-hydroxy-5'-methylphenyl)benzotriazole
UV-2: 2-(2'-hydroxy-3',5'-di-tert-butylphenyl)benzotriazole
UV-3: 2-(2'-hydroxy-3'-tert-butyl-5'-methylphenyl)benzotriazole
UV-4: 2-(2'-hydroxy-3',5'-di-tert-butylphenyl)-5-chloro benzotriazole
UV-5: 2-(2'-hydroxy-3'-(3",4",5",6"-tetrahydro phthalimidomethyl)-5'-methylphenyl)benzotriazole
UV-6: 2,2-methylenebis(4-(1,1,3,3-tetramethylbutyl)-6-(2H-benzotriazole-2-yl) phenol)
UV-7: 2-(2'-hydroxy-3'-tert-butyl-5'-methylphenyl)-5-chlorobenzotriazole
UV-8: 2-(2H-benzotriazole-2-yl)-6-(n- and iso-dodecyl)-4-methylphenol (TINUVIN171, product of Ciba Specialty Chemicals Inc.)
UV-9: Mixture of octyl-3-[3-tert-butyl-4-hydroxy-5-(chloro-2H-benzotriazole-2-yl) phenyl]propionate and 2-ethylhexyl-3-[3-tert-butyl-4-hydroxy-5-(5-chloro-2H-benzotriazole-2-yl) phenyl]propionate (TINUVIN109, product of Ciba Specialty Chemicals Inc.)

Further, specific examples of a benzophenone based compound are shown below, however, the present invention is not limited thereto.

UV-10: 2,4-dihydroxy benzophenone
UV-11: 2,2'-dihydroxy-4-methoxybenzophenone
UV-12: 2-hydroxy-4-methoxy-5-sulfobenzophenone
UV-13: Bis(2-methoxy-4-hydroxy-5-benzoylphenyl methane)

As UV absorbing agent preferably used in the present invention, the benzotriazole or benzophenone type UV absorbing agent is preferably used, because of high transparency, and excellence in effect to prevent deterioration of a polarizing plate and a liquid crystal. The benzotriazole type UV absorbing agent is especially preferably used, because of lesser undesired coloration.

The UV absorbing agent disclosed in JP-A No. 2001-187825 having a distribution coefficient of 9.2 or more provide an improved surface quality of a long roll film and a favorable coating property. Preferable is a UV absorbing agent having a distribution coefficient of 1.01 or more.

A polymer UV absorbing agent (or a UV absorbing polymer) disclosed in Formula (1) or (2) in JP-A No. 6-148430 or Formula (3), (6) or (7) in JP-A No. 2000-156039 is also preferably employable. PUVA-30M (produced by OTSUKA Chemical Co., Ltd.) is commercially available as a polymer UV absorbing agent.

Fine Particles

In order to provide slipping properties to the first and second cellulose ester films of the present invention, it is desirable to add fine particles.

The primary average particle size of fine particles is preferably 20 nm or less, more preferably 5 to 16 nm, and specifically preferably 5 to 12 nm.

These fine particles are preferably contained in a retardation film with the formation of secondary fine particles with a particle size of 0.1 to 5 μm, and the average particle size is preferably 0.1 to 2 μm, and preferably 0.2 to 0.6 μm. With this, convexo-concave patterns with a height of about 0.1 to 1.0 μm high can be formed on a film surface, whereby suitable slipping properties can be given to the film surface.

Measurement of the primary average particle size of the fine particles used for the present invention is conducted such that 100 particles are observed with a transmission type electron microscope (magnification of 500,000 to 2,000,000 times) so as to measure the diameter of the particles and to determine the mean value of the measured diameters as a primary average particle diameter.

An apparent specific gravity of the fine particles is desirably 70 g/liter, more preferably 90 to 200 g/liter, and still more preferably 100 to 200 g/liter. When the apparent specific gravity is larger, it may become more possible to make a high-concentration dispersion liquid and it may become preferable that a haze and a coagulum may be improved. Further, in the case where a dope solution having a high solid concentration is prepared as being like the present invention, it is used especially preferably.

Silicon dioxide fine particles having a mean diameter of primary particles of 20 nm or less and an apparent specific gravity of 70 g/liter or more can be obtained such that, for example, a mixture of vaporized silicon tetrachloride and hydrogen is burn in air at 1000 to 1200° C. Further, for example, silicon dioxide fine particles are commercially available with the trade name of Aerosil 200V and Aerosil R972V (all the above, produced by Japanese Aerosil Corporation), and they can be employed in the present invention.

The apparent specific gravity of the above-mentioned description can be calculated with the following ways, a predetermined quantity of silicon dioxide fine particles is taken in a measuring cylinder, the weight of them is measured at this time, and the apparent specific gravity is calculated with the following formula.

Apparent specific gravity (g/liter)=the weight (g) of silicon dioxide fine particles/the volume (liter) of silicon dioxide fine particles The following three kinds of methods, for example, may be employed as a method of preparing a dispersion solution of fine particles usable in the present invention and a method of adding it in a dope.

Preparing Method A

After stirring and mixing solvent and fine particles, the mixture is dispersed by a homogenizer. The resultant dispersion solution is made as a fine particle dispersion liquid. The fine particle dispersion liquid is added in a dope solution and is stirred.

Preparing Method B

After carrying out stirring mixing a solvent and fine particles, the mixture is dispersed by a homogenizer. The resultant dispersion solution is made as a fine particle dispersion liquid. Separately, a small amount of cellulose triacetate is added in a solvent and dissolved by stirring. The resultant solution is added with the fine particle dispersion liquid and is stirred. The resultant liquid is made as a fine particle additive liquid. The fine particle additive liquid is added in a dope solution and is stirred with a line mixer.

Preparing Method C

A small amount of cellulose triacetate is added in a solvent and dissolved by stirring The resultant solution is added with fine particle and is dispersed by a homogenizer. The resultant liquid is made as a fine particle additive liquid. The fine particle additive liquid is added in a dope solution and is stirred with a line mixer.

Preparing method A is excellent in dispersion ability for the silicon dioxide fine particles, and Preparing method C is excellent in that the silicon dioxide fine particles hardly recoagulates. Among them, Preparing method B described above is excellent in both the point of the dispersion ability for the silicon dioxide fine particles and the point that the silicon dioxide fine particles hardly recoagulates, therefore, is more preferable.

Dispersing Method

When mixing silicon dioxide fine particles with a solvent etc., the concentration of the silicon dioxide is desirably 5% by weight to 30% by weight, more desirably 10% by weight to 25% by weight, most desirably 15% by weight to 20% by weight. When the dispersion concentration is higher, liquid turbidity to added amount tends to become low and a haze and a coagulum may be improved, therefore it may be preferable.

The organic solvent used for dispersion is desirably a lower alcohol. As the lower alcohol, methanol, ethanol, propyl alcohol, isopropyl alcohol, butanol, etc. may preferably be listed. Although a solvent other than the lower alcohol is not limited especially, it is desirable to use a solvent which is used at the time of preparing a dope.

The added amount of silicon dioxide fine particles to a cellulose ester is desirably 0.01 to 0.5 parts by weight of silicon dioxide fine particles to 100 pars by weight of cellulose ester, is more desirably 0.05 to 1.0 parts by weight, and is most desirably 0.1 to 0.5 parts by weight. When the added amount is larger, it may be excellent in a dynamic friction coefficient, and when the added amount is smaller, haze is low and a coagulum becomes little.

As a homogenizer, a usual homogenizer can be used. The homogenizer is roughly divided into a media homogenizer and a medialess homogenizer. As a homogenization for silicon dioxide fine particles, the medialess homogenizer is desirable, because of low haze. As the media homogenizer, a ball mill, a sandmill, a dieno mill, etc. are may be listed.

Although a supersonic wave type, a centrifugal type, a high-pressure type, etc. may be employed as the medialess homogenizer, a high-pressure homogenization apparatus is desirable in the present invention. The high-pressure homogenization apparatus is an apparatus to create a special condition such as a high shearing and a high-pressure state by making a composition mixed of fine particles and a solvent to pass at a high speed through a small tube.

When processing with the high-pressure homogenization apparatus, it is desirable that the maximum pressure condition in a small tube having a pipe diameter of 1 to 2000 μm in the apparatus is 9.8 MPa or more.

The maximum pressure condition is more preferably 19.6 MPa or more. At this time, an apparatus in which the highest arrival velocity reaches 100 m/sec. or more, or an apparatus in which a rate of heat transfer reaches that more than 420 kJ/hour is desirable.

Example of the high pressure dispersing apparatus includes an ultra high speed homogenizer (commercial name: Microfluidizer) manufactured by Microfluidics Corporation and Nanomizer manufactured by Nanomizer Nanomizer Co., Ltd. Other than the above, Manton-Goulin type high pressure dispersing apparatus such as a homogenizer manufactured by Izumi Food Machinery Co., Ltd is applicable.

Further, it is preferable to cast dope containing fine particles so as to come directly in contact with a casting support member, because a film with high slipping properties and low haze can be obtained.

Moreover, the above-mentioned cellulose resin film is separated after casting, is dried and wound up in a rolled form, thereafter, there may be a case where the cellulose resin film is provided with a functional thin layer, such as a hard coat layer and an antireflection layer. In order to protect a cellulose resin film as a product from a soil and waste adhesion by static electricity, the cellulose resin film is usually subjected to a package process until it is processed or shipped.

With regard to a packaging material, as far as the above-mentioned purpose can be achieved, it will not be limited especially, but the packaging material which does not prevent vaporization of remaining solvent from the film is desirable. Concretely, polyethylene, polyester, polypropylene, nylon, polystyrene, paper, various nonwoven fabrics, etc. are listed as the packaging material. A packaging material in which fiber became mesh cross state is used more preferably.

Method for Producing the First and Second Cellulose Ester Films of the Present Invention Next, description will be given with regard to method for producing the first and second cellulose ester films of the present invention.

Even if the first and second cellulose ester films of the present invention are films produced by melt casting method or films produced by solution casting method, these films can be used preferably.

The manufacture of the first and second cellulose ester films of the present invention is conducted by a process of dissolving cellulose ester and additives in a solvent so as to prepare a dope; a process of casting the dope on an endless metal support member which shifts endlessly; a process of drying the cast dope as a web, a process of peeling the web from the metal support member, a process of stretching or holding the width, a process of drying the web further, and a process of winding up the finished film.

A process of preparing a dope is further stated, that is, a higher content or concentration of cellulose resin in the dope is preferable since the load of the drying process following the flow-casting process on a metal support is reduced, however, if the concentration of cellulose resin is too high, the load of the filtration becomes larger and filtration accuracy becomes worse. Preferable content of cellulose resin to satisfy the both is from 10 to 35 percent by weight and more preferably from 15 to 25 percent.

A solvent used in the dope of the present invention may be used alone, however, two or more solvents may also be used together. A mixture of a good solvent for cellulose resin and a poor solvent is more preferably used to increase manufacturing efficiency. A mixed solvent being rich in a good solvent is preferable to increase solubility of the cellulose resin.

The preferable mixing ratio is from 70 to 98 percent by weight of a good solvent, and from 2 to 30 percent of a poor solvent. Herein, the good solvent is defined as being capable of dissolving cellulose resin with a single use, and a poor solvent as swelling or being incapable of dissolving cellulose ester with a single use.

Sometimes, a solvent works as a good solvent of a cellulose ester, and sometimes as a poor solvent depending on the acetification degree (degree of acetyl substitution) of the cellulose ester. For example, acetone becomes a good solvent for an acetic ester of a cellulose resin of which the acetification degree is 2.4, as well as for a cellulose acetatepropionate, however, it becomes a poor solvent for an acetic ester of cellulose of which the acetification degree is 2.8.

Good solvents used in the present invention include, for example: organic halides (such as methylene chloride), dioxolanes, acetone, methyl acetate and methyl acetoacetate, of which methylene chloride and methyl acetate are specifically preferable. However, the present invention is not specifically limited thereto.

Poor solvents used in the present invention include, for example: methanol, ethanol, n-butanol, cyclohexane and cyclohexanone, however, the present invention is not specifically limited thereto. A dope may preferably contain from 0.01 to 0.2 percent by weight of water.

Further, as a solvent utilized for dissolution of cellulose ester, a solvent removed from film by drying in a film casting process is recovered and reused.

In a recovered solvent, a trace amount of additives such as a plasticizer, an ultraviolet absorbent, polymer or monomer components may be contained, however, the solvent may be utilized even containing them or may be utilized appropriately after purification.

In the process of preparing a dope, a cellulose ester is dissolved in a mixture of solvents using a common method. Dissolving a cellulose ester at a higher temperature is possible when the heating is carried out under a higher pressure.

Formation of a gel or an insoluble agglomerate (known as "Mamako" in Japanese which represents insoluble residue when powder is dissolved in a solvent) may be avoided when the dissolving temperatures is higher than the ambient pressure boiling point of the mixed solvents, and simultaneously the temperature is in the range where the mixed solvents do not boil under the applied higher pressure.

The following dissolving method is also preferable, in which a cellulose ester is swollen in a mixture of good and poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes too high.

The dissolving temperature is preferably from 45 to 120° C., more preferably from 60 to 110° C. and still more preferably from 70 to 105° C. The pressure should be controlled not to allow boiling at the set temperature.

A low temperature dissolution method is also preferably utilized, by which cellulose ester is successfully dissolved in solvents such as methyl acetate.

In the next step, the cellulose ester solution thus prepared is filtered using an appropriate filter material. A filter material with a smaller absolute filtration accuracy is more preferable for removing impurities, however, too small a filtration accuracy easily cause clogging up of the filter.

The absolute filtration accuracy of the filter is preferably not larger than 0.008 mm, more preferably from 0.001 to 0.008 mm and still more preferably from 0.003 to 0.006 mm.

The filter material used in the present invention is not specifically limited, and plastic filters (such as polypropylene and Teflon®) as well as metal (alloy) filters (such as stainless steel) are preferable, since these materials are free from peeling of a fiber, which may occur when fibrous material is used.

Impurities and, particularly, luminescent foreign materials contained in the cellulose ester are preferably diminished or entirely removed by filtering.

"Luminescent foreign materials" denote impurities which are observed as bright spots when a cellulose ester film is placed between two polarizing plates arranged in a crossed Nicol state, illuminated with a light from one side and observed from the other. The number of luminescent foreign materials of larger than 0.01 mm in diameter is preferably less than 200 per $cm^2$.

More preferably is less than 100 per $cm^2$ and still more preferably is from 0 to 10 per $cm^2$. The number of luminescent foreign materials of less than 0.01 mm in diameter is preferably minimal.

The dope may be filtered by any common method. One of these preferable filtering methods is to filter the dope at temperatures which are higher than the ambient pressure boiling point of the mixed solvents, and simultaneously in the range where the mixed solvents do not boil under a higher pressure. This method is preferable because the pressure difference between before and after filtering is reduced.

The filtering temperature is preferably from 45 to 120° C., more preferably from 45 to 70° C. and still more preferably from 45 to 55° C.

The pressure applied during filtering is preferably low, being preferably less than 1.6 MPa, more preferably less than 1.2 MPa and still more preferably less than 1.0 MPa.

Casting of a dope will be explained below:

A metal support polished to a mirror finished surface is used in the flow-casting process. A polished stainless steel belt or a plated cast drum is used as a metal support.

The width of the support is preferably from 1 to 4 m. The surface temperature of the metal support is preferably from −50° C. to a temperature just below the boiling point of the solvent. A relatively high temperature of the support is more preferable because the web is more quickly dried, however, too high a temperature may cause foaming or loss of flatness of the web.

The temperature of the support depends on the solvent, however, is preferably in the range of 0 to 55° C., and more preferably 25 to 55° C. Another preferable method is that a web is gelated by cooling the drum followed by peeling the web from the drum while the web still contains much solvent.

The method to control the temperature of the support is not specifically limited and a method of blowing warm or cool air onto the support or to apply warm water on the rear side of the support is acceptable. The warm water method is more preferable because the temperature of the metal support becomes stable in a shorter time due to more efficient thermal conduction. In the case when warm air is used, an air temperature higher than the desired temperature is sometimes used.

In order to obtain a cellulose ester film with a sufficient flatness, the residual solvent content of the web when it is peeled from a metal support is preferably 10-150% by weight, however, it is more preferably 20-40% by weight or 60-130% by weight. The residual solvent content is specifically more preferably 20-30% by weight or 70-120% by weight.

The residual solvent content of the web is defined by the following formula:

Residual solvent content (% by weight)=$\{(M-N)/N\} \times 100$ where M represents the weight of a sample of the web collected in the manufacturing process or after manufacturing, and N represents the weight of the same sample after it was dried at 115° C. for 1 hour.

In the drying process of a cellulose ester film, the film is peeled from the support and further dried until the residual solvent decreases below not more than 1 weight %, more preferably not more than 0.1 weight %, specifically preferably 0-0.01 weight %.

In the film drying process, usually a roll drying method in which a cellulose ester film is passed through many rollers placed alternatively up and down in a staggered manner or a drying process to dry while conveying a film with a tenter method may be employed.

In order to produce the cellulose ester film of the present invention, the stretching of a web in the width direction (transverse direction) with a tenter technique which grips the both ends of the web with a clip etc. is specifically desirable. The web is preferably peeled with a tension of 300 N/m or less.

The method to dry the web is not specifically limited, however, generally, hot air, IR ray, heated rollers or microwave irradiation is used. Hot air is preferably used with respect to ease of cure and low cost.

The preferable drying temperature of a web is from 40 to 200° C. and is preferably increased stepwise.

A cellulose ester film relating to the present invention has preferably a width of from 1 to 4 m, more preferably a width of from 1.4 to 4 m, and specifically preferably a width of from 1.6 to 3 m.

The target retardation values Ro and Rt of the second cellulose ester film of the present invention may be obtained by the cellulose ester film with the raw material structure of the present invention, and further the control of conveyance tension, and the control of refractive index by a stretching operation.

For example, it is possible to perform successive or simultaneous stretching in the longitudinal direction of film (the cast direction) and in the direction perpendicular thereto, that is, in the width direction.

The stretching magnifications in the biaxial directions perpendicular to each other are preferably set to finally 0.8 to 1.5 times in the cast direction and 1.1 to 2.5 times in the width direction, and more preferably set to 0.8 to 1.0 times in the cast direction and 1.2 to 2.0 times in the width direction.

The stretching temperature is preferably 120° C. to 200° C., more preferably 150° C. to 200° C., still more preferably higher than 150° C. and not higher than 190° C.

It may be preferable to stretch a film under the condition where the content of the residual solvent in the film is 20 to 0%, more preferably 15 to 0%.

More concretely, the film is preferably stretched under the condition that the content of the residual solvent is 11% at 155° C., or the content of the residual solvent is 2% at 155° C. Otherwise, the content of the residual solvent is 11% at 160° C., or the content of the residual solvent is not higher than 1% at 160° C.

A method to stretch a web is not specifically limited. For example, listed a method to stretch in the longitudinal direction by making a circumferential speed difference among plural rolls and utilizing the roll circumferential speed difference among them, a method to stretch in the longitudinal direction by fixing the both edge of a web with clips or pins and widening the intervals between clips and pins toward the proceeding direction, a method to stretch by widening similarly along the width direction, or a method to stretch in the both of longitudinal and width directions by simultaneously widening along the longitudinal and width directions. Of cause, these methods can be utilized in combination.

In a so-called tenter method, it is prefer able that a smooth stretching can be performed by driving the clip portion by a linear drive method which reduces risk to such as break.

It is preferable to perform the width holding or stretching in the width direction by a tenter, which may be either a pin tenter or a clip tenter.

The slow axis or the fast axis of optical compensation film of this invention preferably is present in a film plane and θ1 is preferably not less than −1° and not more than +1°, and more preferably not less than −0.5° and not more than +0.5°, when the angle against the casting direction is θ1.

This θ1 can be defined as an orientation angle, and measurement of θ1 can be performed by use of automatic double refractometer KOBRA-21ADH (Oji Scientific Instruments). To satisfy the above-described relationships by θ1 can contributes to obtain a high luminance and to restrain or prevent light leak, and to obtain faithful color reproduction in a color liquid display (Physical Properties of the first and second cellulose ester films of the present invention)

Moisture permeability of the first and second cellulose ester films relating to the present invention is preferably 300 to 1,800 g/m$^2$·24 h, more preferably 400 to 1,500 g/m$^2$·24 h and specifically preferably 40 to 1,300 g/m$^2$·24 h at 40° C., 90% RH. Moisture permeability can be measured according to a method described in JIS Z 0208.

Elongation percentage of the first and second cellulose ester films relating to the present invention is preferably 10 to 80% and more preferably 20 to 50%.

Visible light transmittance of the first and second cellulose ester films relating to the present invention is preferably not less than 90% and more preferably not less than 93%.

Haze of the first and second cellulose ester films relating to the present invention is preferably less than 1% and specifically preferably 0 to 0.1%.

In the second cellulose ester film relating to the present invention, it is desirable that difference in refractive index between its one surface and its opposite surface (also referred to as a film obverse surface and reverse surface) is in a range of $5 \times 10^{-4}$ or more and $5 \times 10^{-3}$ or less.

The reason why is as follows. If a polarizing plate is made thin, the stiffness of the polarizing plate becomes weak. Accordingly, when the polarizing plate is pasted on a liquid crystal cell, generation of air bubbles and positional deviation tend to occur. Therefore, curl intentionally given to the second cellulose ester film enhances the stiffness of the polarizing plate, whereby the above problems at the time of pasting of the polarizing plate onto the liquid crystal cell can be reduced.

The first cellulose ester film of the present invention is a film arranged preferably at the viewing side, and it is desirable to prepare function layers, such as a hard coat layer, an antiglare layer, and the like on at least one surface of the first cellulose ester film.

Hard Coat Layer

It is desirable that a hard coat layer is disposed on the first cellulose ester film used in the present invention as a function layer.

The hard coat layer used in the present invention is disposed on at least one surface of a polarizing plate protective film. The polarizing plate protective film of the present invention preferably constitutes an antireflection film in which antireflection layers (a high refractive index layer, a low refractive index layer, etc.) are disposed on the hard coat layer. As a hard coat layer, an activity ray curable resin layer is used preferably.

Antiglare Layer

An antiglare layer preferably contains translucent fine particles in order to provide antiglare properties.

Next, translucent fine particles will be described.

Translucent Fine Particles

The translucent fine particles are preferably constituted by two or more kinds of fine particles. As the constitution of two or more kinds of fine particles, a combination of the first translucent fine particles with an average particle size of 0.01 to 1 μm or less and the second translucent fine particles with an average particle size of 2 to 6 μm is preferable from the point of exhibiting the object effect of the present invention.

The average particle size of translucent fine particles 1 is 0.01 to 1 μm, and more preferably 0.05 μm to 1 μm. The average particle size of translucent fine particles 2 is 2 to 6 μm, and more preferably 3 μm to 6 μm.

With the first translucent fine particles with an average particle size of 0.01 to 1 μm, internal haze can be controlled easily, and suppression of lowering of the strength of films at the time of saponification treatment with alkali solution and the suppression effect of lowering of the strength of films under the condition of exposure to ozone can be exhibited sufficiently. With the second translucent fine particles with an average particle size of 2 to 6 μm, the distribution of scattering angles of light becomes good, and there is no fear to cause un-sharpness of characters on a display.

Moreover, since the film thickness of an antiglare layer does not become thick, curl does not become large, and raw material cost can also be held at low. In this connection, these average particle sizes can be measured, for example, with a laser diffraction type particle size distribution measuring device.

Examples of the second translucent fine particles with an average particle size of 2 to 6 μm include acrylic particles, styrene particles, acrylic-styrene particles, melamine particle, benzoguanamine particles, and inorganic particles containing silica as main components, and preferable examples include fluorine-containing acrylic resin fine particles, poly ((meth)acrylate) particles, cross-linked poly((meta)acrylate) particles, polystyrene particles, cross-linked polystyrene particles, and cross-linked poly(acrylic-styrene) particles. Among them, fluorine-containing acrylic resin fine particles are preferable from the viewpoints of sufficient exhibition of object effect of the present invention.

Examples of the fluorine containing acryl resin fine particles include, fine particles formed by monomer or polymer of fluorine containing acrylate ester or methacrylate ester. Specific examples of the fluorine containing acrylate or methacrylate includes 1H,1H,3H-tetrafluoropropyl(meth)acrylate, 1H,1H,5H-octafluoropentyl(meth)acrylate, 1H,1H,7H-dodecafluoroheptyl(meth)acrylate, 1H,1H,9H-hexadecafluorononyl(meth)acrylate, 2,2,2-trifluoroethyl (meth)acrylate, 2,2,3,3,3-pentafluoropropyl(meth)acrylate, 2-(perfluorobutyl)ethyl(meth)acrylate, 2-(perfluorohexy) ethyl(meth)acrylate, 2-(perfluorooctyl)ethyl(meth)acrylate, 2-perfluorodecyl ethyl(meth)acrylate, 3-perfluorobutyl-2-hydroxypropyl(meth)acrylate, 3-perfluorohexyl-2-hydroxypropyl(meth)acrylate, 3-perfluorooctyl-2-hydroxypropyl (meth)acrylate, 2-(perfluoro-3-methylbutyl)ethyl(meth) acrylate, 2-(perfluoro-5-methylhexyl)ethyl(meth)acrylate, 2-(perfluoro-7-methyloctyl)ethyl(meth)acrylate, 3-(perfluoro-3-methylbutyl-2-hydroxypropyl(meth)acrylate, 3-(perfluoro-5-methylhexyl)-2-hydroxypropyl(meth)acrylate, 3-(perfluoro-7-methyloctyl)-2-hydroxypropyl(meth) acrylate, 1H-1-(trifluoromethyl)trifluoro ethyl(meth)acrylate, 1H,1H,3H-hexafluoro butyl(meth)acrylate, trifluoroethylmethacrylate, tetrafluoropropylmethacrylate, perfluorooctylethylacrylate and 2-(perfluorobutyl)ethyl-α-fluoroacrylate.

Among the fluorine containing acryl resin fine particles, fine particles composed of 2-(perfluorobutyl)ethyl-α-fluoro-acrylate, fluorine containing polymethylmethacrylate fine particles, and fine particles obtained by copolymerization of fluorine containing methacrylic acid with vinyl monomer in the presence of a linking agent are preferable, and more preferable is fluorine containing polymethylmethacrylate fine particles.

The vinyl monomers capable of copolymerization with fluorine containing (meth)acrylic acid may be those having a vinyl group, and specific examples include alkylmethacrylate such as methylmethacrylate, and butylmethacrylate; alkylacrylate such as methylacrylate and ethyl acrylate; and styrenes such as α-methylstyrene such as styrene. These may be used singly or in mixture.

Crosslinking agent used in polymerization reaction is not particularly limited, and those having two or more unsaturated groups may be used. Examples of the crosslinking agents include two functional dimethacrylate such as ethyleneglycol dimethacrylate, polyethyleneglycol dimethacrylate, trimethylol propane trimethacrylate and divinyl benzene.

Polymerization reaction to prepare fluorine containing polymethylmethacrylate fine particles may be both of random copolymerization or block copolymerization. A method described in, for example, JP-A 2000-169658 may be listed practically.

Available products in the market include, for example, FS-701, manufactured by Nippon Paint Co., Ltd., MF-0043, manufactured by Negami Chemical industrial Co., ltd. The fluorine containing acryl resin fine particles are used singly or two or more in combination. Moreover, the states of these fluorine-containing acrylic resin fine particles to be added may be any states, such as powder or emulsion.

Moreover, the fluorine-containing cross linking particles described at the paragraphs 0028-0055 in Japanese Unexamined Patent Publication No. 2004-83707 may be employed.

Examples of polystyrene type fine particles include commercial products, such as SX-130H, SX-200H and SX-350H, manufactured by Soken Chemical & Engineering Co., Ltd., and SBX series (SBX-6 and SBX-8) manufactured by Sekisui Plastics Co., Ltd.

The melamine polymer type fine particles include, for example, benzoguanamine-melamine-formaldehyde condensation product (trade names of EPOSTAR GRADE M30 and EPOSTARGP GRADE H40 to H110, manufactured by Nippon Shokubai Co., Ltd,), melamine-formaldehyde condensation product (trade names of EPOSTAR GRADE S12, S6, S, and SC4). Further core-shell type sphere composite hardened melamine resin particles, in which the core is composed of melamine type resin and shell is filled with silica, is mentioned. Practically it is manufactured by a method described in JP-A 2006-171033, and includes product in the market such as melamine resin-silica composite particles (Trade name of OPTOBEADS, manufactured by Nissan Chemical Industries, Ltd.).

Examples of poly(meth)acrylate) fine particles and cross-linking poly(meth)acrylate) fine particles, include products in the market, for example, MX150 and MX300, manufactured by Soken Chemical & Engineering Co., Ltd.; EPOSTAR MA GRADE MA1002, MA1004, MA1006, MA1010, EPOSTARMX (Emulsion), GRADE MX020W, MX030W, MX050W and MX100W), manufactured by Nippon Shokubai Co., Ltd; MBX series (MBX-8 and MBX12), manufactured by Sekisui Plastics Co., Ltd.

Specific examples of cross-linking poly(meth)acrylate) fine particles, include FS-201, and MG-351 manufactured by Nippon Paint Co., Ltd.

Examples of benzoguanamine type particles, include benzoguanamine formaldehyde condensation product (trade name: Epostar, grade; L15, M05, MS, SC25) produced by NIPPON SHOKUBAI Corporation.

From the viewpoint of the stability of the coating liquid to form an antiglare layer and the dispersibility of a dispersion liquid, the content of the second translucent fine particles with an average particle size of 2 to 6 μm is preferably 0.01 to 500 parts by weight, more preferably 0.1 to 100 parts by weight, and specifically preferably 1 to 60 parts by weight to 100 parts by weight of activity energy ray curable resins mentioned later.

As the first translucent fine particles with an average particle size of 0.01 to 1 μm, inorganic particles including acrylic particles and silica as main components are employable. Examples of silica fine particles include products in the market, such as Aerosil 200, 200V and 300, manufactured by Nippon Aerosil Corporation, Aerosil OX50 and TT600, manufactured by Degussa Corporation, and KEP-10, KEP-50, KEP-100, manufactured by NIPPON SHOKUBAI Co., Ltd. Further, colloidal silica may be employed.

Colloidal silica is a dispersion of silicon dioxide in water or organic solvent as colloidal state, and has shapes of sphere, needle or necklace, without being particularly limited thereto. The colloidal silica is obtained from the market, for example, SNOWTEX series by Nissan Chemical Industries, Ltd., CATALOID-S series by JGC Catalysts and Chemicals Ltd. and LEVASIL series by Bayer.

Further, preferably employed is necklace shaped colloidal silica which is formed by linking colloidal silica or primary particles of silica, which are subjected to cationic modification by alumina sol or aluminum hydroxide, with two or more valent metal ion in the form of necklace via bonding between particles.

Examples of the necklace shaped colloidal silica includes SNOWTEX AK series, SNOWTEX PS series and SNOW-TEX UP series by Nissan Chemical Industries, Ltd., practically, for example, IPS-ST-L (isopropanol silica sol, particle diameter of 40 to 50 nm, silica concentration of 30%) and MEK-ST-MS (methyl ethyl ketone silica sol, particle diameter of 17 to 23 nm, silica concentration of 35%), MEK-ST (methyl ethyl ketone silica sol, particle diameter of 10 to 15 nm, silica concentration of 30%), MEK-ST-L (methyl ethyl ketone silica sol, particle diameter of 40 to 50 nm, silica concentration of 30%), MEK-ST-UP (methyl ethyl ketone silica sol, particle diameter of 9 to 15 nm (chain structure), silica concentration of 20%).

As acrylic particles, fluorine-containing acrylic resin fine particles may be employable, for example, the commercial products of FS-701 produced by Nippon Paint Corporation may be used. Further, examples of acrylic particles include S-4000 produced by Nippon Paint Corporation, and examples of acrylic styrene particles include S-1200 and MG-251 produced by Nippon Paint Corporation.

Among the first translucent fine particles with an average particle size of 0.01 to 1 μm, fluorine-containing acrylic resin fine particles are preferable form the viewpoints of more exhibition of object effects of the present invention.

From the viewpoint of the stability of the coating liquid to form an antiglare layer and the dispersibility of a dispersion liquid, the content of the first translucent fine particles with an average particle size of 0.01 to 1 μm is preferably 0.01 to 500 parts by weight, and more preferably 0.1 to 100 parts by weight to 100 parts by weight of translucent resins mentioned later.

Moreover, the content ratio of the first translucent fine particles (translucent fine particles 1) with an average particle size of 0.01 to 1 μm and the second translucent fine particles (translucent fine particles 2) with an average particle size of 2 to 6 μm is the translucent fine particles 1:translucent fine particles 2=1.0:1.0 to 3.0:1.0. The use of two kinds of fine particles different in particle size with the above-mentioned content ratio is preferable in the points that excellent effects are exhibited in depression of lowering of the film strength after the saponification treatment with an alkaline bath and in depression of lowering of the film strength after the durability test under exposition to ozone, and these effects are not expected from prior art technique.

The above-mentioned translucent fine particles may be added in any one of states, such as powder and emulsion. Further, the density of translucent fine particles is preferably 10 to 1000 mg/m$^2$, and more preferably 100 to 700 mg/m$^2$.

Saponification Treatment Condition

The first and second cellulose ester films used for a polarizing plate of the present invention is pasted on a polarizer after the saponification treatment. In the case where the concentration of an alkaline solution for saponification is in a range of 1 to 4 mol %, the saponification temperature is 10 to 80° C., and the saponification time is 10 to 100 seconds, saponification is required to be conducted on the saponification treatment conditions where the relationship between the saponification index M1 of a polarizing plate protective film (the first cellulose ester film) and the saponification index M2 of a retardation film (the second cellulose ester film) satisfy the conditional formula (M1>M2). Preferably, the saponification treatment is conducted on the condition that (M1−M2) becomes 45 to 175.

The saponification index M is the index of a saponification efficiency, and as a numerical value is larger, the efficiency becomes higher. The saponification index M is represented by the product of an alkali concentration, a saponification temperature, and a saponification time.

Saponification index (M): the concentration (mol %) of an alkaline solution for saponification×a saponification temperature (×$\frac{1}{10}$° C.)×a saponification time (×$\frac{1}{10}$ seconds)

For example, in the case where the alkali-concentrations is 2 mol % and the saponification temperatures is 50° C., and the saponification time is 90 seconds, a saponification index becomes (2×5×9=90).

At the time of the saponification treatment of the first cellulose ester film of the present invention, the saponification index is preferably 90 to 220, and more preferably 90 to 180.

At the time of the saponification treatment of the second cellulose ester film of the present invention, the saponification index is preferably 5 to 45. By the setting of the respective saponification indexes of a polarizing plate protective film and a retardation film within the above respective ranges, when the polarizing plate of the present invention is incorporated in a liquid crystal display device, streak-like irregularities at the time of black indication and wavy image irregularities after preservation under wet heat conditions can be reduced while acquiring sufficient adhesiveness with the polarizer, and problems of elution of film, precipitation of additives, wrinkles at the time of pasting, involution of air bubbles, and the like can be suppressed efficiently.

From the viewpoints of saponification efficiency, a higher alkali concentration is better. However, time deterioration (ph and precipitation of carbonate) due to absorption of carbon dioxide gas in the atmosphere becomes large, and problems arise in the viewpoint of uniformity of treatment.

As a means for suppressing the time deterioration, in order to reduce the concentration of carbonic acid near a saponification tank, reduced pressure, covering with inert gases, and the like may be preferable embodiments. However, such a means may not be enough for suppression. Then, by representation of saponification conditions with index via a combination with time which can be controlled easily without variation stabilization can be achieved in consideration of not only difference in characteristics of film but also variation in production. In this connection, the saponification liquid is composed of alkaline chemicals and water, and may contain surface active agents and compatibilizing agents depending on the case.

Examples of alkaline chemicals include inorganic alkaline chemicals, such as sodium tertiary phosphate, potassium tertiary phosphate, ammonium tertiary phosphate, sodium secondary phosphate, potassium secondary phosphate, ammonium secondary phosphate, ammonium carbonate, ammonium hydrogen carbonate, sodium borate, potassium borate, ammonium borate, sodium hydroxide, potassium hydroxide, lithium hydroxide, and ammonium hydroxide. Moreover, organic alkaline chemicals may be also used. These alkaline chemicals may be used solely or may be used in combination of two or more kinds. Among these alkaline chemicals, sodium hydroxide and potassium hydroxide may be preferable, and from the viewpoints of the stability of a saponification liquid, potassium hydroxide may be more preferable.

The solvent of an alkaline solution is an independent solvent of water, or a mixture solvent of water and an organic solvent. Preferable examples of organic solvent include alcohols, alkanols, mono-ethers of glycol compounds, ketones, amides, sulfoxides, and ethers. More preferable examples include ethylene glycol, propylene glycol, butanediol, pentane diol, hexane diol, glycerin mono-methyl ether, glycerin mono-ethyl ether, cyclohexane diol, cyclohexane dimethanol, diethylene glycol, dipropyrene glycol, and the like.

In the case of any one of the first and second cellulose ester films, a saponification temperature is needed to be selected from a range of 10 to 80° C., and is preferably 30 to 60° C.

A saponification time is suitably selected in relation to a required saponification performance and productivity. However, in the case of any one of the first and second cellulose ester films, a saponification time is needed to be conducted in a range of 10 to 180 seconds, is preferably 10 to 120 seconds, and is preferably 0 to 100 seconds.

In the case of any one of the first and second cellulose ester films, the concentration of an alkaline solution for saponification is needed to be conducted in a range of 1 to 4 mol %, and is preferably 1.5 to 3 mol %.

Polarizing Plate

The polarizing plate of the present invention includes a polarizer, a first cellulose ester film (polarizing plate protective film) composed of cellulose ester with an acyl group total substitution degree of 2.8 to 3.0 and a second cellulose ester film (retardation film) composed of cellulose ester with an acyl group total substitution degree of 2.1 to 2.6 and having a retardation value Ro, represented by a formula shown below, of 30 nm or more and 200 nm or less and a retardation value Rt of 70 nm or more and 300 nm or less, which are pasted so as to sandwich the polarizer.

Specifically, the first cellulose ester film and the second cellulose ester film are subjected to saponification treatment so as to satisfy a conditional formula of M1>M2, wherein when saponification treatment conditions are represented by a saponification index M represented by a formula shown below in the case where the concentration of an alkaline solution for saponification is in a range of 1 to 4 mol %, the saponification temperature is 10 to 80° C., and the saponification time is 10 to 100 seconds, M1 is the saponification index of the first cellulose ester film and M2 is the saponification index of the second cellulose ester film.

In order to acquire the effects of the present invention, it is indispensable that the saponification index M1 of the first cellulose ester film and the saponification index M2 of the second cellulose ester film satisfy the conditional formula of M1>M2. Further, a difference between the saponification indexes is preferably 45 to 175, and more preferably 60 to 150.

As mentioned above, the saponification treatment conducted within the above ranges reduces streak-like irregularities at the time of incorporation of the polarizing plate of the present invention in a liquid crystal display device, and wavy image irregularities after preservation under wet heat conditions while acquiring sufficient adhesiveness with the polarizer. Further, the saponification treatment can suppress efficiently problems, such as elution of film, precipitation of additives, wrinkles at the time of pasting, and involution of air bubbles. Furthermore, the saponification treatment can prevent efficiently unevenness, distortion, and streaks of a polarizing plate due to elution from film surfaces of the first cellulose ester film and the second cellulose ester film, precipitation of additives, and dispersion of contact angles and due to thy, fluctuation in environment such as aging preservation, adhesion, evenness (convexo-concave) at the time of production of a polarizing plate.

It is desirable to conduct saponification treatment for the first and second cellulose ester films of the present invention with respective conditions different in saponification index and to paste the treated films onto a polarizer relating to the present invention with a full saponification type polyvinyl alcohol aqueous solution.

A commercially-available cellulose ester film can also be used as the first cellulose ester film of the present invention. Preferable examples of the commercially-available cellulose ester films include KC8UX2M, KC4UX, KC5UX, KC4UY, KC8UY, KC12UR, KC8 UX-RHA (all the above, manufactured by Konica Minolta Opt. Inc.).

Further, a polarizing plate can be constituted such that a protective film is pasted on one surface of this polarizing plate and a separate film is pasted on the opposite surface. The protective film and the separate film are used for the purpose of protection of the surface of the polarizing plate at the time of shipment of the polarizing plate and at the time of product inspection.

In this case, the protective film is pasted for the purpose of protection of the surface of the polarizing plate and incorporated at a surface side opposite to a surface of the polarizing plate to be pasted on a liquid crystal plate. Further, the separate film is used for the purpose of covering on an adhesive layer to be pasted on the liquid crystal plate and incorporated at the surface of the polarizing plate to be pasted on the liquid crystal plate.

The use of this polarizing plate enables to provide a liquid crystal display device with high display performance. Particularly, in the liquid crystal display which uses a direct backlight, it becomes possible to obtain the liquid crystal display devices with small environmental fluctuation and reduced light leakage at peripheral portions on a screen.

Display Device

The use of the polarizing plate of the present invention enables to produce display devices of the present invention excellent in various visibilities. The retardation film of the present invention may be employed for liquid crystal display devices of various drive types, such as STN, TN, OCB, HAN, VA (MVA, PVA), and IPS.

Among them, VA (MVA, PVA) type liquid crystal display devices are most preferably. Particularly, effects are remarkable in the liquid crystal display devices with a large screen of 30 or more type, and there are few environmental variations, and it becomes possible to obtain the liquid crystal display devices with small environmental fluctuation and reduced light leakage at peripheral portions on a screen.

Although a back light employed for the liquid crystal display devices employing the polarizing plate of the present invention may be a side light type, a direct type or a combination of them, a direct type backlight is preferably employed.

The particularly-desirable direct type backlight is an LED back light for color liquid crystal display devices which has red (R) LED, green (G) LED, and blue (B) LED. In the preferably-usable LED back light, for example, a peak wavelength of the red (R) LED is 610 nm or more, a peak wavelength of the green (G) LED is in a range of 530±10 nm, peak wavelength of the blue (B) LED is 480 nm or less. Examples of the kinds of the green (G) LED with a peak wavelength within the above range include DG1112H (manufactured by Stanley Electric Co., Ltd.), UG1112H (manufactured by Stanley Electric Co., Ltd.), E1L51-3G (manufactured by TOYODA GOSEI CO., LTD.), E1L49-3G (manufactured by TOYODA GOSEI CO., LTD.), NSPG500S (manufactured by Nichia Corp.), and the like.

Examples of the kinds of LEDs used as the red (R) LED include FR1112H (manufactured by Stanley Electric Co., Ltd.), FR5366X (manufactured by Stanley Electric Co., Ltd.), NSTM515AS (manufactured by Nichia Corp.), GL3ZR2D1COS (manufactured by Sharp), and GM1JJ35200AE (manufactured by Sharp), and the like.

Examples of the kinds of LEDs used as the blue (B) LED include DB1112H (manufactured by Stanley Electric Co., Ltd.), DB5306X (manufactured by Stanley Electric Co., Ltd.), E1L51-3B (manufactured by TOYODA GOSEI CO., LTD.), E1L4 E-SB 1A (manufactured by TOYODA GOSEI CO., LIU), NSPB630S (made by Nichia Corp.), NSPB310A (manufactured by Nichia Corp.), and the like.

The above-mentioned three color LEDs may be combined into a back light. Alternatively, a white LED may also be used.

In addition, examples of the direct type backlight (or direct method) include a direct type backlight described in Japanese Unexamined Patent Publication No. 2001-281656, a direct type backlight using spot-like light sources such as LED described in Japanese Unexamined Patent Publication No. 2001-305535, a direct type backlight described in Japanese Unexamined Patent Publication No. 2002-311412, and the like. However, it is not necessary to limit only to these.

EXAMPLE

Although the present invention will be concretely explained with reference to examples, the present invention is not limited to these examples. Unless otherwise specified, in examples, "%" and "parts" represent "% by weight" and "parts by weight".

Example 1

Production of the Second Cellulose Ester Film

Production of the Second Cellulose Ester Film 101

The cellulose esters used herein were changed in terms of the degree of substitution and the kind of substituent as shown in Table 1.

TABLE 1

| cellulose ester | degree of substitution | |
|---|---|---|
| | acetyl group | total acyl group |
| A | 2.0 | 2.0 |
| B | 2.1 | 2.1 |
| C | 2.2 | 2.2 |
| D | 2.4 | 2.4 |
| E | 2.49 | 2.49 |
| F | 2.6 | 2.6 |
| G | 1.9 | 1.9 |
| H | 2.7 | 2.7 |

Particulate Dispersion Liquid

| | |
|---|---|
| Particulate (Aerosil 972 V manufactured by Japan Aerosil) (average particle size of primary particles: 16 nm, apparent specific gravity: 90 g/litter) | 11 parts by weight |
| Ethanol | 89 parts by weight |

The substances listed above were agitated and mixed by a dissolver for 50 minutes and then dispersed by the use of Manton Gaulin.

Particulate Additive Liquid

Cellulose ester A was added into a solution tank storing methylene chloride, heated and dissolved completely. Thereafter the resultant solution was filtered by the use of Azumi filter paper No. 244 manufactured by Azumi Filter Paper Co., Ltd. While the filtered cellulose ester solution was fully being agitated, particulate dispersion liquid was added slowly into the solution. Furthermore, the solution was dispersed by an at-righter so that the particle size of secondary particles became a predetermined size. The resultant solution was filtered by the use of Fine Met NF manufactured by Nippon Seisen Co., Ltd., whereby particulate additive liquid was prepared.

| | |
|---|---|
| Methylene chloride | 99 parts by weight |
| Cellulose ester B | 4 parts by weight |
| Particulate dispersion liquid 1 | 11 parts by weight |

A main dope liquid of the following composition was prepared. First, methylene chloride and ethanol were added to a pressure solution tank. Cellulose ester B was supplied into the pressure solution tank storing a solvent while being agitated. Further, it was dissolved completely while being heated and agitated. The resultant liquid was filtered by the use of Azumi filter paper No. 244 manufactured by Azumi Filter Paper Co., Ltd., whereby the main dope liquid was prepared.

Into 100 parts by weight of the main dope solution, 5 parts by weight of the particulate additive liquid was added, and then sufficiently mixed by an inline mixer (Toray static in-line mixer Hi-Mixer SWJ). Then, by the use of a belt casting device, the resultant mixture solution was evenly cast with a width of 2.0 m on a stainless steel band support.

The solvent was evaporated on the stainless steel band support until the remaining solvent amount became 110%, and then the cast film was peeled from the stainless steel band support. At the time of peeling, the web (peeled film) was stretched with tension such that a longitudinal stretching ratio (MD) became 1.1 times. Subsequently, the web was further stretched by a tenter grasping the both ends of the web such that a stretching ratio in the width (TD) direction became 1.3 times. After the stretching, the web was held for several seconds while the width of the web was maintained with tension, then the tension in the width direction was relaxed, and successively, the maintaining of the width was released. Subsequently, the web was dried by being conveyed in a third drying zone set as 125° C. for 30 minutes, whereby the second cellulose ester film 101 which had a width of 1.5 m, a thickness of 50 μm, and embosses at both ends with a width of 1 cm and a height of 8 μm was produced.

Composition of Main Dope

| | |
|---|---|
| Methylene chloride | 390 parts by weight |
| Ethanol | 80 parts by weight |
| Cellulose ester B | 100 parts by weight |
| Plasticizer: ester compound, Compound 4 | 10 parts by weight |
| Plasticizer: aromatic terminal ester type plasticizer | 2.5 parts by weight |

Retardation films (the second cellulose ester film) 102 to 110 were produced in the same way as with the above except that the composition (cellulose) of the dope liquid was changed as shown in Table 2.

The resulting retardation films 101 to 110 were subjected to measurement of an in-plane retardation value R0, a thickness direction retardation value Rt, and the refractive index of the obverse and reverse by the following procedures, and the measurement results are shown in Table 2.

Measurement of Retardation Ro and Rt $$Ro = (nx - ny) \times d$$

$$Rt = \{(nx + ny)/2 - nz\} \times d$$

(in the formula, nx is a film in-plane refractive index in the slow axis direction, ny is a film in-plane refractive index in the fast axis direction, nz is a refractive index in the film thickness direction, nx>ny, and d is a thickness (nm) of a film.)

With an Abbe refraction index meter equipped with an eye piece with a polarizing plate and a spectrum light source, a refraction index was measured in one direction, the direction perpendicular to the one direction, and the direction vertical to the film surface on both surfaces of a retardation film, and an average refraction index is determined from the average value of these measurements. Further, the thickness of the film was measured using a commercially-available micrometer.

Films were left uncontrolled for 24 hours under the environment of 23° C. and 55% RH, and thereafter retardation of the films were measured by the use of an automatic birefringence analyzer (KOBRA-21ADH manufactured by Oji Scientific Instruments) under the above environment with a wavelength of 590 nm. The above-mentioned refraction index and the thickness were input into the above formulas, hereby determining an in-plane retardation value (Ro) and a thickness direction retardation value (Rt).

TABLE 2

| second cellulose ester film | kind of cellulose ester | retardation value nm | |
|---|---|---|---|
| | | Ro | Rt |
| 101 | D | 50 | 130 |
| 102 | A | 60 | 140 |
| 103 | B | 55 | 135 |
| 104 | C | 50 | 130 |
| 105 | E | 50 | 130 |
| 106 | F | 45 | 120 |
| 107 | G | 60 | 145 |
| 108 | H | 20 | 65 |
| 109 | G | 95 | 305 |
| 110 | D | 75 | 230 |

Production of the First Cellulose Ester Film

Production of the First Cellulose Ester Film 201

Silicon Dioxide Dispersion Liquid

| | |
|---|---|
| Aerosil 972 V (manufactured by Japan Aerosil) (average particle size of primary particles: 16 nm, apparent specific gravity: 90 g/litter) | 12 parts by weight |
| Ethanol | 88 parts by weight |

The substances listed above were agitated and mixed by a dissolver for 30 minutes and then dispersed by the use of Manton Gaulin.

Into the silicon dioxide dispersion liquid, 88 parts by weight of methylene chloride was added while stirring, and the resulting mixture was stirred and mixed for 30 minutes by the dissolver, whereby silicon dioxide dispersion diluent was prepared.

Preparation of In-Line Additive Liquid

| | |
|---|---|
| TINUVIN 109 (Manufactured by Chiba Specialty Chemicals) | 11 parts by weight |
| TINUVIN 171 (Manufactured by Chiba Specialty Chemicals) | 5 parts by weight |
| Methylene chloride | 100 parts by weight |

The substances above were charged into a sealed container and heated while being stirred so as to be completely dissolved and then filtered.

Into the resultant liquid, 36 parts by weight of the silicon dioxide dispersion diluent was added while stirring, and after stirring for a further 30 minutes, 6 parts by weight of cellulose triacetate was added while stirring, and after stirring for further 60 minutes, the resultant liquid was filtered with a polypropylene wind cartridge filter TCW-PPS-1N of Advantech Toyo Company, whereby inline additive liquid was prepared.

Preparation of Dope Solution

| | |
|---|---|
| Cellulose triacetate (Mn = 150,000, Mw = 300,000, acetyl group substitution degree: 2.91) | 100 parts by weight |
| Trimethylolpropan tribenzoate | 5 parts by weight |
| ethyl phthalyl ethyl glycolate | 5 parts by weight |
| Methylene chloride | 440 parts by weight |
| Ethanol | 40 parts by weight |

The substances above were charged into a sealed container and completely dissolved by being heated and stirred, and then filtered using Azumi filter paper No. 24 manufactured by Azumi Filter Paper Co., Ltd., whereby dope solution was prepared.

The dope solution was filtered by use of Fine Met NF manufactured by Nippon Seisen Co., Ltd in a film manufacturing line. The inline additive liquid was filtered by the Fine Met NF manufactured by Nippon Seisen Co., Ltd in the in-line additive liquid line. Two parts by weight of the filtered inline additive liquid was added to 100 parts by weight of the filtered dope solution, and then was sufficiently mixed with an inline mixer (Toray static in-tube mixer Hi-Mixer SWJ). Subsequently, by use of a belt casting device, the resultant solution was evenly cast on a stainless steel band support with a width of 1.8 m at a temperature of 35° C.

The solvent was evaporated on the stainless steel band support until the remaining solvent amount became 120%, and then the cast film was peeled from the stainless steel band support. The peeled cellulose ester web was heated to 35° C. so as to evaporate the solvent, was slit so as to have a width of 1.65 m, and thereafter was dried with a drying temperature of 135° C. while being stretched to 1.05 times in the TD direction (the direction perpendicular to the conveyance direction of the film) by a tenter. The remaining solvent amount at the time of start of stretching with the tenter was 30%.

Thereafter, the film was dried while being conveyed with many rollers in the drying zones of 110° C. and 120° C., was slit so as to have a width of 1.5 m, and was subjected to a knurling process applied to both edges of the film with a width of 15 mm and a height of 10 μm, whereby the first cellulose ester film with a thickness of 60 μm was produced.

As a result of measurement of the retardation value, Ro and Rt were 3 nm and 50 nm respectively.

Production of the First Cellulose Ester Film 202

The first cellulose ester film 202 with a width of 1.5 m and an average film thickness of 40 μm was produced in the same way as that of the first cellulose ester film 201 except that the film thickness was changed to 40 μm.

Ro and Rt of the retardation values were 2 nm and 35 nm respectively.

Production of the First Cellulose Ester Film 203

The first cellulose ester film 203 with a width of 1.5 m and an average film thickness of 50 μm was produced in the same way as that of the first cellulose ester film 201 except that the film thickness was changed to 50 μm.

Ro and Rt of the retardation values were 3 nm and 45 nm respectively.

Production of a Polarizing Plate

Production of the Polarizing Plate 1

In accordance with the following processes 1 to 5, a polarizing plate 1 was produced by use of the second cellulose ester film 101 and first cellulose ester film 202.

Process 1: The second cellulose ester film 101 and first cellulose ester film 202 were immersed in an aqueous solution containing 2 mol/L of sodium hydroxide at 50° C. for 90 seconds, then these films were washed with water and dried, whereby the second cellulose ester film 101 and first cellulose ester film 202 in which the side of the respective films to be pasted onto a polarizer was saponified were obtained.

Process 2: The polarizer was immersed in a polyvinyl alcohol adhesive tank containing 2% by weight of solids for 1 to 2 seconds.

Process 3: The excessive adhesive attached to the polarizing film in the process 2 was gently wiped off, and the polarizer was put on the second cellulose ester film 101 and the first cellulose ester film 202 having been treated in the process 1.

Process 4: The second cellulose ester film, the polarizing film, the polarize, and the first cellulose ester film at the back side which were laminated in the process 3, were pasted with a pressure of 20 to 30 N/cm$^2$, and a conveying speed of about 2 m/min.

Process 5: The sample in which the second cellulose ester film, the polarizer, and the first cellulose ester film were pasted in the process 4 were dried for 5 minutes in a dryer of 80° C., whereby a polarizing plate 1 was prepared.

The above-produced retardation films 101 to 110 and the polarizing plate protective films 201 to 203 were combined as shown in Table 3, and were pasted in accordance with respective saponification treatment conditions, whereby polarizing plates 1 to 44 were produced.

In the production of the polarizing plates 43 and 44, the sodium hydroxide in the above-mentioned process 1 was changed to potassium hydroxide.

TABLE 3

| polarizing plate No. | second cellulose ester film | | | | first cellulose ester film | | | | | difference | remarks |
|---|---|---|---|---|---|---|---|---|---|---|---|
| | No. | *1 | saponification time | saponification temperature | saponification index | No. | *1 | saponification time | saponification temperature | saponification index | | |
| 1 | 101 | 2 | 90 | 50 | 90 | 202 | 2 | 90 | 50 | 90 | 0 | comp. |
| 2 | 102 | 2 | 90 | 50 | 90 | 202 | 2 | 90 | 50 | 90 | 0 | comp. |
| 3 | 103 | 2 | 90 | 50 | 90 | 202 | 2 | 90 | 50 | 90 | 0 | comp. |
| 4 | 104 | 2 | 90 | 50 | 90 | 202 | 2 | 90 | 50 | 90 | 0 | comp. |
| 5 | 105 | 2 | 90 | 50 | 90 | 202 | 2 | 90 | 50 | 90 | 0 | comp. |
| 6 | 106 | 2 | 90 | 50 | 90 | 202 | 2 | 90 | 50 | 90 | 0 | comp. |
| 7 | 101 | 2 | 45 | 40 | 36 | 202 | 2 | 90 | 50 | 90 | 54 | inv. |
| 8 | 102 | 2 | 45 | 40 | 36 | 202 | 2 | 90 | 50 | 90 | 54 | inv. |
| 9 | 103 | 2 | 45 | 40 | 36 | 202 | 2 | 90 | 50 | 90 | 54 | inv. |
| 10 | 104 | 2 | 45 | 40 | 36 | 202 | 2 | 90 | 50 | 90 | 54 | inv. |
| 11 | 105 | 2 | 45 | 50 | 45 | 202 | 2 | 90 | 50 | 90 | 45 | inv. |
| 12 | 106 | 2 | 45 | 50 | 45 | 202 | 2 | 90 | 50 | 90 | 45 | inv. |
| 13 | 107 | 2 | 45 | 50 | 45 | 202 | 2 | 90 | 50 | 90 | 45 | comp. |
| 14 | 108 | 2 | 45 | 50 | 45 | 202 | 2 | 90 | 50 | 90 | 45 | comp. |
| 15 | 101 | 0.5 | 20 | 50 | 5 | 202 | 5 | 90 | 50 | 225 | 220 | comp. |
| 16 | 102 | 0.5 | 20 | 50 | 5 | 202 | 5 | 90 | 50 | 225 | 220 | comp. |
| 17 | 103 | 0.5 | 20 | 50 | 5 | 202 | 5 | 90 | 50 | 225 | 220 | comp. |
| 18 | 104 | 0.5 | 20 | 50 | 5 | 202 | 5 | 90 | 50 | 225 | 220 | comp. |
| 19 | 105 | 0.5 | 20 | 50 | 5 | 202 | 5 | 90 | 50 | 225 | 220 | comp. |
| 20 | 106 | 0.5 | 20 | 50 | 5 | 202 | 5 | 90 | 50 | 225 | 220 | comp. |
| 21 | 101 | 2 | 45 | 40 | 36 | 201 | 2 | 90 | 50 | 90 | 54 | inv. |
| 22 | 102 | 2 | 45 | 40 | 36 | 201 | 2 | 90 | 50 | 90 | 54 | inv. |
| 23 | 103 | 2 | 45 | 40 | 36 | 201 | 2 | 90 | 50 | 90 | 54 | inv. |
| 24 | 104 | 2 | 45 | 40 | 36 | 201 | 2 | 90 | 50 | 90 | 54 | inv. |
| 25 | 105 | 2 | 45 | 50 | 45 | 201 | 2 | 90 | 50 | 90 | 45 | inv. |
| 26 | 106 | 2 | 45 | 50 | 45 | 201 | 2 | 90 | 50 | 90 | 45 | inv. |
| 27 | 107 | 2 | 45 | 50 | 45 | 201 | 2 | 90 | 50 | 90 | 45 | comp. |
| 28 | 108 | 2 | 45 | 50 | 45 | 201 | 2 | 90 | 50 | 90 | 45 | comp. |
| 29 | 101 | 2 | 45 | 50 | 45 | 203 | 2 | 90 | 50 | 90 | 45 | inv. |
| 30 | 102 | 2 | 45 | 50 | 45 | 203 | 2 | 90 | 50 | 90 | 45 | inv. |
| 31 | 103 | 2 | 45 | 50 | 45 | 203 | 2 | 90 | 50 | 90 | 45 | inv. |
| 32 | 104 | 2 | 45 | 50 | 45 | 203 | 2 | 90 | 50 | 90 | 45 | inv. |
| 33 | 105 | 2 | 45 | 50 | 45 | 203 | 2 | 90 | 50 | 90 | 45 | inv. |
| 34 | 106 | 2 | 45 | 50 | 45 | 203 | 2 | 90 | 50 | 90 | 45 | inv. |
| 35 | 109 | 2 | 45 | 50 | 45 | 202 | 2 | 90 | 50 | 90 | 45 | comp. |
| 36 | 110 | 2 | 45 | 50 | 45 | 202 | 2 | 90 | 50 | 90 | 45 | inv. |
| 37 | 107 | 2 | 45 | 50 | 45 | 203 | 2 | 90 | 50 | 90 | 45 | comp. |
| 38 | 108 | 2 | 45 | 50 | 45 | 203 | 2 | 90 | 50 | 90 | 45 | comp. |
| 39 | 101 | 2 | 30 | 50 | 30 | 202 | 5 | 82 | 50 | 205 | 175 | inv. |
| 40 | 101 | 0.5 | 16 | 50 | 4 | 202 | 4 | 90 | 50 | 180 | 176 | comp. |
| 41 | 101 | 2 | 45 | 50 | 45 | 202 | 2 | 89 | 50 | 89 | 44 | comp. |
| 42 | 104 | 2 | 45 | 40 | 36 | 201 | 2 | 81 | 50 | 81 | 45 | inv. |
| 43 | 101 | 2 | 90 | 50 | 90 | 202 | 2 | 90 | 50 | 90 | 0 | comp. |
| 44 | 101 | 2 | 45 | 50 | 45 | 202 | 2 | 90 | 50 | 90 | 45 | inv. | comp.: comparative example,
inv.: inventive example,
*1: alkaline concentration

Production of a Liquid Crystal Display

Liquid crystal panels were produced in the following ways, and the characteristics as a polarizing plate and a liquid crystal display were evaluated.

Polarizing plates pasted preliminary on the both sides in SONY 20 type display KLV-20AP2 were peeled off, and the above-produced polarizing plates 1 to 44 were pasted on the glass surfaces of the liquid crystal cell respectively.

At that time, the polarizing plates were pasted such that the surface of the second cellulose ester film was disposed at the liquid crystal side and its absorption axis is oriented in the same direction as that of the preliminary-pasted polarizing plate, and liquid crystal displays 1 to 44 were prepared as shown in Table 4.

Evaluation

Polarizing Plate Deterioration: Polarization Degree Change

First, the parallel transmittance and the perpendicular transmittance were measured for the polarizing plates produced in the above ways, and the polarization degree was calculated in accordance with the following formula. Thereafter, the respective polarizing plates were subjected to enforced degradation under the condition of 60° C. and 90% RH for 1000 hours, and successively the parallel transmittance and the perpendicular transmittance were measured again for the polarizing plates. Subsequently, the polarization degree was calculated in accordance with the following formula. The polarization degree change amount was determined as the amount of polarizing plate deterioration by the following formula.

Polarization degree P (%)=((H0−H90)/(H0+H90))½×100
Polarization degree change amount=P0−P1000
H0: Parallel transmittance
H90: Perpendicular transmittance
P0: Polarization degree before enforced degradation
P1000: Polarization degree after enforced degradation for 1000 hours

Polarizing Plate Dimensional Stability

In order to evaluate distortion of the polarizing plates, the polarizing plate dimensional stability was evaluated under the following conditions.

The polarizing plates were subjected to moisture control for 24 hours in the chamber of 23° C. and 55% RH, two crosses were marked with an interval of 100 mm in the lengthwise direction and the widthwise direction on the surface of the respective polarizing plates, and the distance between the two crosses was measured and represented with "a". The polarizing plates were subjected to processing with 60° C. and 90% RH for 120 hours, and thereafter, subjected to moisture control for 24 hours in the chamber of 23° C. and 55% RH. Then, the distance between the two crosses was measured and represented with "b". Subsequently, the polarizing plate dimensional stability was determined as a dimension change ratio by the following formula.

Dimension change ratio (%)=((b−a)/a)×100

The polarizing plate 44 produced by use of potassium hydroxide exhibited good results as compared with the polarizing plate 7 produced by use of sodium hydroxide.

Streaks

In order to check deterioration by heat for the above-prepared liquid crystal display devices, the liquid crystal display devices were subjected processing for 300 hours on the conditions of 60° C., and thereafter, were returned to the condition of 23° C. and 55% RH. Subsequently, at two hours after the power source switch was put in service to turn on the back light, streaks at the time of the black indication mode was visually checked and evaluated based on the following criteria.

A: no streak
B: Weak streaks existed at the central potion.
C: Weak streaks existed from the central potion to the edge portions.
D: Strong streaks existed on the entire surface.

Streaks with the rank of A or B are evaluated as no problem for practical use.

Evaluation of Visibility

The above-produced liquid crystal display devices were subjected processing for 100 hours on the conditions of 60° C. and 90% RH, and thereafter, were returned to the condition of 23° C. and 55% RH. Subsequently, the surfaces of the respective liquid crystal display devices were visually observed and evaluated based on the following criteria.

A: No wavy unevenness was observed on the surface.
B: Wavy unevenness was slightly observed on the surface.
C: Fine wavy unevenness was slightly observed on the surface.
D: Fine wavy unevenness was observed on the surface.

The above evaluation results are shown in Table 4.

TABLE 4

| polarizing plate No. | polarizing plate deterioration % | polarizing plate dimension stability % | liquid crystal display device No. | streaks | visibility | remarks |
|---|---|---|---|---|---|---|
| 1 | 8.0 | −0.65 | 1 | C | C | comparative example |
| 2 | 14.0 | −1.30 | 2 | D | D | comparative example |
| 3 | 13.0 | −1.20 | 3 | D | D | comparative example |
| 4 | 12.0 | −1.15 | 4 | D | D | comparative example |
| 5 | 7.0 | −0.75 | 5 | C | C | comparative example |
| 6 | 8.0 | −0.70 | 6 | C | C | comparative example |
| 7 | 2.0 | −0.20 | 7 | A | A | inventive example |
| 8 | 4.5 | −0.45 | 8 | B | B | inventive example |
| 9 | 4.0 | −0.40 | 9 | B | B | inventive example |
| 10 | 3.5 | −0.30 | 10 | B | B | inventive example |
| 11 | 2.0 | −0.20 | 11 | A | A | inventive example |

TABLE 4-continued

| polarizing plate No. | polarizing plate deterioration % | polarizing plate dimension stability % | liquid crystal display device No. | streaks | visibility | remarks |
|---|---|---|---|---|---|---|
| 12 | 1.5 | −0.18 | 12 | A | A | inventive example |
| 13 | 10.0 | −1.05 | 13 | D | C | comparative example |
| 14 | 9.0 | −0.75 | 14 | C | C | comparative example |
| 15 | 9.0 | −0.70 | 15 | C | C | comparative example |
| 16 | 15.0 | −1.35 | 16 | D | D | comparative example |
| 17 | 14.0 | −1.30 | 17 | D | D | comparative example |
| 18 | 13.0 | −1.25 | 18 | D | D | comparative example |
| 19 | 8.0 | −0.80 | 19 | C | C | comparative example |
| 20 | 7.5 | −0.75 | 20 | C | C | comparative example |
| 21 | 1.5 | −0.20 | 21 | A | A | inventive example |
| 22 | 4.0 | −0.45 | 22 | B | B | inventive example |
| 23 | 3.5 | −0.40 | 23 | B | B | inventive example |
| 24 | 4.0 | −0.30 | 24 | B | B | inventive example |
| 25 | 1.5 | −0.20 | 25 | A | A | inventive example |
| 26 | 2.0 | −0.18 | 26 | A | A | inventive example |
| 27 | 10.0 | −1.05 | 27 | D | C | comparative example |
| 28 | 8.0 | −0.75 | 28 | C | C | comparative example |
| 29 | 2.0 | −0.20 | 29 | A | A | inventive example |
| 30 | 4.0 | −0.45 | 30 | B | B | inventive example |
| 31 | 3.5 | −0.40 | 31 | B | B | inventive example |
| 32 | 4.0 | −0.30 | 32 | B | B | inventive example |
| 33 | 2.0 | −0.20 | 33 | A | A | inventive example |
| 34 | 1.5 | −0.18 | 34 | A | A | inventive example |
| 35 | 8.5 | −0.80 | 35 | C | C | comparative example |
| 36 | 4.0 | −0.45 | 36 | B | B | inventive example |
| 37 | 9.5 | −1.05 | 37 | D | C | comparative example |
| 38 | 8.0 | −0.75 | 38 | C | C | comparative example |
| 39 | 4.5 | −0.35 | 39 | B | B | inventive example |
| 40 | 8.0 | −0.70 | 40 | C | C | comparative example |
| 41 | 8.5 | −0.65 | 41 | C | C | comparative example |
| 42 | 4.0 | −0.40 | 42 | B | B | inventive example |
| 43 | 7.5 | −0.65 | 43 | C | C | comparative example |
| 44 | 1.5 | −0.15 | 44 | A | A | inventive example |

It turns out from the above tables that the combination of the second cellulose ester films 101 to 110 with the retardation of the present invention, the polarizing plate of the present invention in which the saponification indexes was adjusted to 45 to 175, and the liquid crystal display devices 7 to 12, 21 to 26, 29 to 34, 36, 39, 42, and 44 were excellent in polarizing degree change and polarizing plate distortion even with fluctuation of environmental conditions and were excellent in streak and visibility as a liquid crystal display device.

The liquid crystal display devices employing the polarizing plate of the present invention were excellent in flatness. In contrast, in the comparative liquid crystal display devices, fine wavy unevenness was observed. Accordingly, the observation for a long time made eyes get tired easily.

Example 2

The polarizing plates 35, 36 produced in Example 1 were plated on one side of the liquid crystal cell, and the polarizing plate 35 produced in the following ways was pasted on the opposite side. Successively, the liquid crystal display devices 45 and 46 of the present invention were prepared in the same ways as that in Example 1.

Production of the Polarizing Plate 45

The polarizing plate 45 was produce in the same way as the polarizing plates in Example 1 such that both surfaces were sandwiched with the first cellulose ester film 203.

Evaluation

View Angle Evaluation

In the view angle evaluation, view angles on the liquid crystal panel on which the above-obtained polarizing plate of the present invention was pasted was measured by use of EZ-contrast manufactured by ELDIM Corporation. Further, the view angle evaluation was made as to whether the contrast ratio between the white indication mode and the black indication mode of the liquid crystal panel was 10 or more, and about the range of inclination angles from the normal line direction to the panel surface which showed a region causing reverse.

As a result, the liquid crystal display 46 of the present invention had a very high view angle improving properties as compared with the liquid crystal display 45. Accordingly, it turned out that the use of on sheet of a retardation film ensure sufficient optical compensation.

The invention claimed is:

1. A polarizing plate, comprising:
a first cellulose ester film containing a cellulose ester with a total acyl group substitution degree of 2.8 to 3.0;
a second cellulose ester film containing a cellulose ester with a total acyl group substitution degree of 2.0 to 2.6; and
a polarizer sandwiched between the first cellulose ester film and the second cellulose ester film,
wherein the second cellulose ester film has a retardation value Ro, represented by a formula shown below, of 30 to 200 nm and a retardation value Rt of 70 to 300 nm, and when M1 represents a saponification index in a saponification treatment conducted for the first cellulose ester film and M2 represents a saponification index in a saponification treatment conducted for the second cellulose ester film, M1 and M2 satisfy a conditional formula: M1>M2, wherein M1 is in a range of 90 to 220, M2 is in a range of 5 to 45, and the difference between M1 and M2 is 45 to 175, $Ro=(nx-ny)\times d$ $Rt=\{(nx+ny)/2-nz\}\times d$ where nx is a film in-plane refractive index in a slow axis direction, ny is a film in-plane refractive index in a fast axis direction, nz is a refractive index in a film thickness direction, and d is a thickness (nm) of a film, and the saponification index (M)=a concentration (mol %) of an alkaline solution for saponification×a saponification temperature (×1/10° C.)×a period of time for saponification (×1/10 seconds).

2. The polarizing plate described in claim 1, wherein the cellulose ester contained in the second cellulose ester film has an acetyl group substitution degree of 2.0 to 2.6.

3. The polarizing plate described in claim 1, wherein the cellulose ester contained in the second cellulose ester film has a total acyl group substitution degree of 2.1 to 2.5.

4. The polarizing plate described in claim 3, wherein the cellulose ester contained in the second cellulose ester film has a total acyl group substitution degree of 2.2 to 2.5.

5. A liquid crystal display device, comprising
a liquid crystal cell; and
the polarizing plate described in claim 1 and disposed on at least one surface of the liquid crystal cell.

6. A method for producing a polarizing plate in which a polarizer is sandwiched between a first cellulose ester film and a second cellulose ester film, wherein the first cellulose ester film contains a cellulose ester with a total acyl group substitution degree of 2.8 to 3.0, and
the second cellulose ester film contains a cellulose ester with a total acyl group substitution degree of 2.0 to 2.6 and has a retardation value Ro, represented by a formula shown below, of 30 to 200 nm and a retardation value Rt of 70 to 300 nm, the method comprising the steps of:
subjecting the first cellulose ester film and the second cellulose ester film to a saponification treatment respectively, and
pasting the first cellulose ester film and the second cellulose ester film, which have been subjected to the saponification treatment, onto the polarizer,
wherein when M1 represents a saponification index in the saponification treatment conducted for the first cellulose ester film and M2 represents a saponification index in the saponification treatment conducted for the second cellulose ester film, M1 and M2 satisfy a conditional formula: M1>M2, wherein M1 is in a range of 90 to 220, M2 is in a range of 5 to 45, and the difference between M1 and M2 is 45 to 175, $Ro=(nx-ny)\times d$ $Rt=\{(nx+ny)/2-nz\}\times d$ where nx is a film in-plane refractive index in a slow axis direction, ny is a film in-plane refractive index in a fast axis direction, nz is a refractive index in a film thickness direction, and d is a thickness (nm) of a film, and the
saponification index (M)=a concentration (mol %) of an alkaline solution for saponification×a saponification temperature (×1/10° C.)×a period of time for saponification (×1/10 seconds).

* * * * *